United States Patent
Gallagher

(10) Patent No.: US 6,728,416 B1
(45) Date of Patent: Apr. 27, 2004

(54) ADJUSTING THE CONTRAST OF A DIGITAL IMAGE WITH AN ADAPTIVE RECURSIVE FILTER

(75) Inventor: Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/457,036

(22) Filed: Dec. 8, 1999

(51) Int. Cl.[7] .................................................. G06K 9/40
(52) U.S. Cl. ....................... 382/265; 382/173
(58) Field of Search ................. 382/260, 275, 382/286, 173, 180

(56) References Cited

U.S. PATENT DOCUMENTS

| | | | |
|---|---|---|---|
| 5,012,333 A | 4/1991 | Lee et al. ..................... | 358/80 |
| 5,454,044 A | 9/1995 | Nakajima .................... | 382/132 |
| 5,467,404 A | 11/1995 | Vuylsteke et al. .......... | 382/274 |
| 5,471,987 A | 12/1995 | Nakazawa et al. .......... | 128/659 |
| 5,796,870 A | 8/1998 | Takeo ......................... | 382/232 |
| 5,848,181 A | 12/1998 | Ogata ......................... | 382/169 |
| 5,872,867 A * | 2/1999 | Bergen ....................... | 382/285 |
| 5,881,181 A | 3/1999 | Ito .............................. | 382/274 |
| 5,905,817 A | 5/1999 | Matama ...................... | 382/260 |
| 6,009,447 A * | 12/1999 | Kubota et al. .............. | 708/313 |
| 6,317,521 B1 * | 11/2001 | Gallagher et al. .......... | 382/260 |
| 6,469,734 B1 * | 10/2002 | Nichani et al. ............. | 348/152 |
| 6,547,678 B2 * | 4/2003 | Barfield ...................... | 382/254 |

OTHER PUBLICATIONS

U.S. patent application Ser. No. 09/224,028, Andrew C. Gallagher, et al., filed Dec. 31, 1998.
U.S. patent application Ser. No. 09/163,645, Andrew C. Gallagher, et al., filed Sep. 30, 1998.
"Digital Image Processing" by R. Gonzales and R. Woods. Addison–Wesley Publishing Company, Inc., 1993.
"Image Contrast Enhancement Using Homomorphic Processing and Adaptive Filters" by Mohiy M. Hadhoud. Proceedings of the Sixteenth National Radio Science Conference, NRSC '99 (IEEE CAT No. 99EX249), Proceeding of the Sixteenth National Radio Science Conference, NRSC '99, Cairo, Egypt, Feb. 23–25, 1999.

* cited by examiner

Primary Examiner—Jingge Wu
(74) Attorney, Agent, or Firm—David M. Woods

(57) ABSTRACT

A method and structure for adjusting the contrast of a digital image includes inputting an image, dividing the image into a pedestal signal and a texture signal, applying a tone scale function to the pedestal signal to produce a modified pedestal signal, and adding the texture signal to the modified pedestal signal to produce a processed digital image channel. The dividing filters a pixel of the image using weighting that is dependent upon coefficients of neighboring pixels adjacent the pixel. The filtering blurs the pedestal signal such that flat areas of the image are blurred more that discontinuities in the image.

9 Claims, 14 Drawing Sheets

ARF PASS 1

|   | j=0 |   |   | j=4 |
|---|---|---|---|---|
| i=0 | $a_2$ | $a_3$ |   |   |
|   | $a_1$ | $b_0$ |   |   |
|   |   |   |   |   |
|   |   |   |   |   |
| i=4 |   |   |   |   |

FIG. 8A

ARF PASS 2

|   | j=0 |   |   | j=4 |
|---|---|---|---|---|
| i=0 |   |   |   |   |
|   |   |   |   |   |
|   |   |   | $b_0$ | $a_1$ |
|   |   |   | $a_3$ | $a_2$ |
| i=4 |   |   |   |   |

FIG. 8B

ARP FASS 3

|   | j=0 |   |   | j=4 |
|---|---|---|---|---|
| i=0 |   |   | $a_3$ | $a_2$ |
|   |   |   | $b_0$ | $a_1$ |
|   |   |   |   |   |
|   |   |   |   |   |
| i=4 |   |   |   |   |

FIG. 8C

ARF PASS 4

|   | j=0 |   |   | j=4 |
|---|---|---|---|---|
| i=0 |   |   |   |   |
|   |   |   |   |   |
|   | $a_1$ | $b_0$ |   |   |
|   | $a_2$ | $a_3$ |   |   |
| i=4 |   |   |   |   |

FIG. 8D

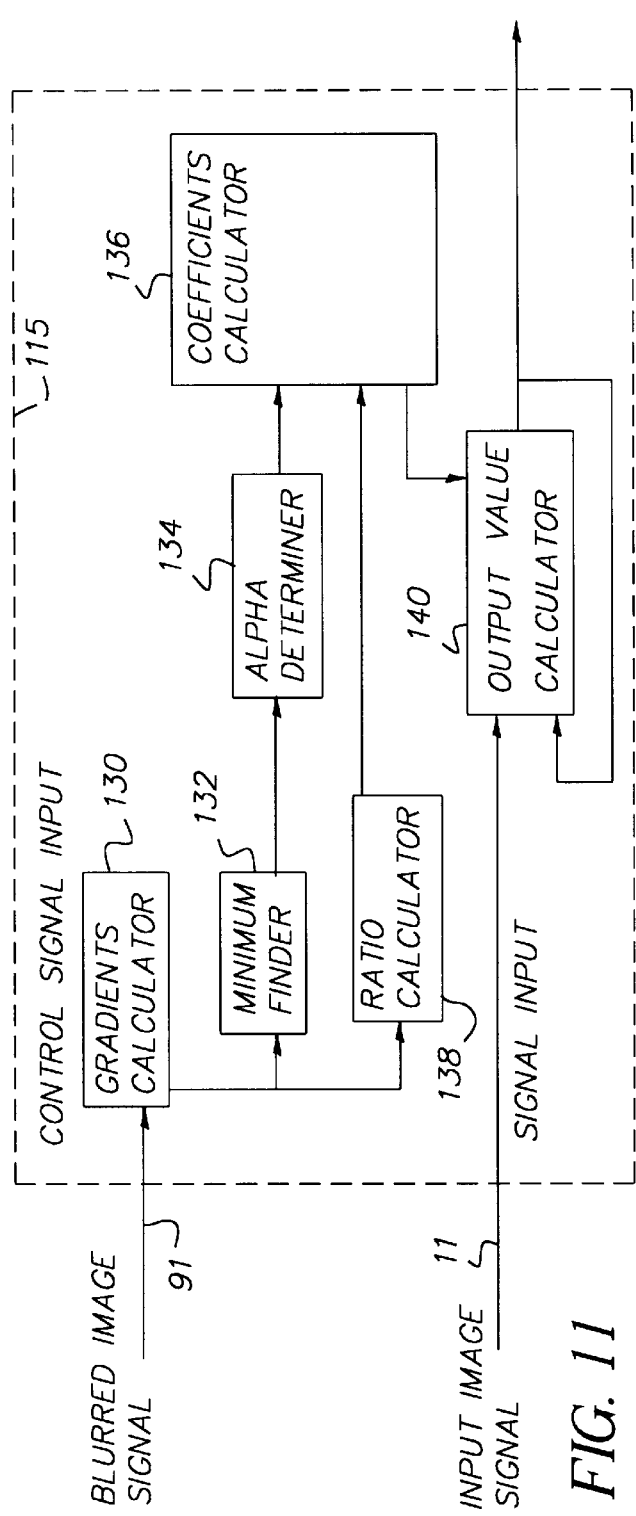
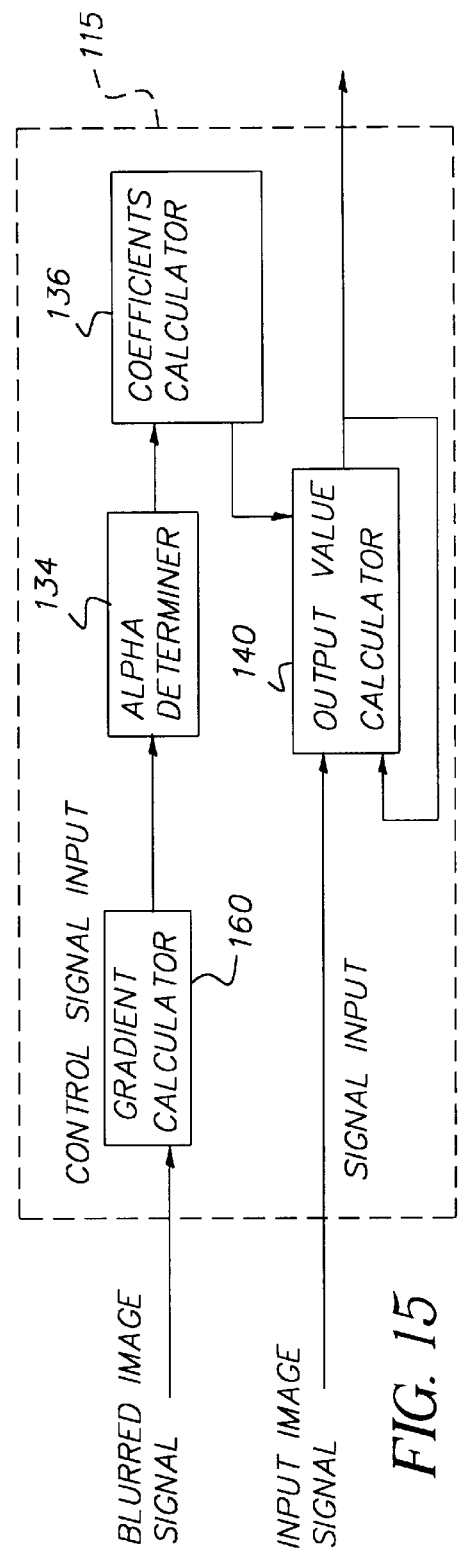
FIG. 11
FIG. 15

ADJUSTING THE CONTRAST OF A DIGITAL IMAGE WITH AN ADAPTIVE RECURSIVE FILTER

BACKGROUND OF THE INVENTION

1. Field of the Invention

The invention generally relates to improving the contrast in digital images, and more specifically to an adaptive recursive filter which forms a pedestal signal from the original digital image. A tone scale function is applied to the pedestal signal and a texture signal is added to attain a processed digital image.

2. Description of the Related Art

It is well known that the dynamic range of photographic paper is less than the typical scene dynamic range. The result of this incongruity is that a good deal of scene content is rendered to black or white on the photographic print. For this reason, in an image-processing environment, a tone scale function may be used to reduce the scene dynamic range in order to map more information onto the display medium. There exist many processes for creating a tone scale function on an image dependent basis (e.g., see, U.S. Pat. No. 5,471,987 to Nakazawa et al. (hereinafter "Nakazawa"), incorporated herein by reference). Each of the conventional tone scale function processes examines certain statistical characteristics of the image under consideration in order to automatically generate the tone scale function. In addition, tone scale functions may be generated with manual interactive tools.

After the tone scale function has been generated, there exists the question of how to apply the tone scale function to the digital image. The goal of dynamic range compression is to adjust the overall dynamic range of the image, rather than to affect the contrast of any given object in the image. In essence, tone scale functions meant to reduce the image dynamic range should be applied in such a way as to minimize the effect on the scene texture. This criterion excludes the possibility of applying the tone scale function directly to the image luminance channel. Thus, it is common to apply the tone scale function to a lower frequency sub-band of the image, preserving the higher frequency sub-band(s) that are considered to be image texture (e.g., see, U.S. Pat. No. 5,012,333, to Lee et al. (hereinafter "Lee") incorporated herein by reference).

As mentioned above, after the tone scale function has been generated, there exists the question of how to apply the tone scale function to the digital image. Application of a tone scale function meant for dynamic range compression directly to each color channel of an image results in desaturation. For this reason, it is a common practice to apply the tone scale function to a luminance (neutral) representation of the image. Direct application of the tone scale function to the image neutral channel tends to result in compression of detail in addition to compression of the overall image dynamic range, resulting in an image with a flat appearance.

Lee describes a procedure for preserving the high frequency detail of an image by blurring the image neutral channel in order to create a lowpass signal. Subtracting the lowpass signal from the image neutral channel produces a highpass signal. The processed image is generated by applying the tone scale function to the lowpass signal and adding the result to the high-pass signal. This procedure preserves a segment of the image frequency spectrum; however, artifacts are seen at large boundaries.

A. Gallagher and E. Gindele built on this work with U.S. Pat. No. 6,317,521, based on application Ser. No. 09/163, 645, filed Sep. 30, 1998 (hereinafter "Gallagher"; incorporated herein by reference). More specifically, Gallagher incorporated an artifact avoidance scheme along with a single standard FIR filter to generate the texture signal. Also, in U.S. Pat. No. 5,454,044, Nakajima suggests modifying the image contrast by the formula $S_{proc} = S_{org} + f(S_{us})$. In Nakajima incorporated herein by reference), the low frequency image $S_{us}$ is passed through function $\partial(\ )$ which is a monotonically decreasing function. This signal is added to the original $S_{org}$ to create the processed image $S_{proc}$.

Another example is an FIR (finite impulse response) filter based process known as homomorphic filtering (e.g., see R. Gonzalez, R. Woods, *Digital Image Processing*, Addison-Wesley Publishing Company, New York, 1992, pp. 213–218, incorporated herein by reference), which modifies the low frequencies of an image to achieve a contrast modification. In homomorphic filtering, the high frequency information is again considered to be the image texture.

In U.S. Pat. No. 5,905,817, Matama (incorporated herein by reference) describes using an IIR (infinite impulse response) filter in essentially the same framework described by Lee. The advantage to this approach is speed. In addition, by using an IIR filter, the computational requirements remain constant despite any change to the desired level of blurring.

Each of these methods of applying a tone scale function to an image channel rely on a single blurring with a linear filter. Because of this, there is an inherent size selectivity property in the tone scale function application process. Image structures that are spatially smaller than a certain size are preserved, while details larger than that size are affected by the tone scale function. In addition, the preservation of high frequencies in an image may lead to the creation of unsharp mask type artifacts (overshoot and undershoot) in the neighborhood of large edges (characteristic of occlusion boundaries or dark shadows).

In general, it was observed that larger digital filters (used to create the lowpass signal) result is a more pleasing processed image, except for the fact that the artifacts become more objectionable. Thus, the goal is to achieve greater amounts of blur without producing the overshoot artifacts at edges. Several pyramid schemes have been developed in order to achieve this goal. Because the pyramid schemes consist of multiscale representations of the same image objects, the detail size range that is preserved may be modified throughout the image.

U.S. Pat. No. 5,467,404 to Vuylsteke et al. (incorporated herein by reference) describes a method of adjusting the coefficients of a wavelet pyramid in order to modify the contrast of the image while preserving details (and producing no artifacts). In U.S. Pat. No. 5,881,181 (incorporated herein by reference), Ito describes a general multi-resolution approach intent on achieving the same goals. These methods produce satisfactory results, but require a large number of filtering operations.

Another approach to the problem of tone scale function application is to use nonlinear filtering techniques that essentially preserve edges but blur out detail. In U.S. Pat. No. 5,796,870 (incorporated herein by reference), Takeo describes a large rectangular filter, long in the direction along an edge and short in the direction across an edge. This approach reduces the artifacts at edges, but diagonal edges pose a problem. Further, Nakazawa describes using an FIR filter whose weights are determined at each pixel location, based upon the absolute value of the difference of pixel intensities between two pixels falling under the digital filter.

However, this method does not account for noise in the image, and is very time consuming.

Problems to be Solved by the Invention

None of the conventional methods discussed above allows for a relatively fast filtering means that preserves details (without requiring a specific detail size range). One drawback of conventional techniques is that direct application of the tone scale function to the image neutral channel tends to result in compression of detail in addition to compression of the overall image dynamic range, resulting in an image with a flat appearance. Further, generating the processed image by applying the tone scale function to the lowpass signal and adding the result to the high-pass signal preserves a segment of the image frequency spectrum; however, produces artifacts that can be seen at large boundaries.

There is an inherent size selectivity property in the tone scale function application process. Image structures that are spatially smaller than a certain size are preserved, however details larger than that size are adversely affected by the tone scale function. In addition, the preservation of high frequencies in an image may lead to the creation of unsharp mask type artifacts (overshoot and undershoot) in the neighborhood of large edges (characteristic of occlusion boundaries or dark shadows).

The relatively fast adaptive recursive filter described below allows the application of a tone scale function to a digital image to adjust the macro-contrast of the image, preserves detail without reference to a specific detail size range, and prevents artifacts in the neighborhood of large edges.

SUMMARY OF THE INVENTION

The invention comprises a process called the Adaptive Recursive Filter (ARF) tone scale function application process. With the inventive tone scale application process, the digital image channel is decomposed into pedestal and texture signals. The tone scale function is applied to the pedestal signal and the texture signal is added to obtain a processed digital image channel.

An important feature of the invention is the method implemented to generate the pedestal signal. More specifically, the invention includes a recursive filter that adaptively performs more blurring in relatively flat areas of the image and less blurring at large discontinuities.

The invention described below was developed to enable tone scale modification for dynamic range compression with reduced artifacts and fast implementation. More specifically, with the invention image decomposition is enabled by an adaptive recursive filter (ARF).

The invention inputs an image, divides the image into a pedestal signal and a texture signal, applies a tone scale function to the pedestal signal to produce a modified pedestal signal, and adds the texture signal to the modified pedestal signal to produce a processed digital image channel. The dividing filters a pixel of the image using weighting that is dependent upon coefficients of neighboring pixels adjacent the pixel. The filtering blurs the pedestal signal, such that flat areas of the image are blurred more than edges in the image.

The filtering is recursive filtering that includes four-pass recursive filtering, which includes forward filtering the digital image channel in a first direction, filtering the result of the first filtering stage in the reverse of the first direction, forward filtering the result of this second filtering stage in a second direction perpendicular to the first direction, and filtering the result of the third filtering stage in the reverse of the second direction.

The recursive filtering can also include performing a plurality of cascaded four-pass recursive filtering processes wherein an output of a previous four-pass recursive filtering process comprises an input for a next four-pass recursive filtering process. Alternatively, the recursive filtering could include performing a plurality of cascaded four-pass recursive filtering processes wherein an output of a first four-pass recursive filtering process comprises an input for all remaining four-pass recursive filtering processes.

The filtering includes calculating gradients of the neighboring pixels, finding a minimum gradient of the neighboring pixels, applying the minimum gradient to a look up table to output a first variable, determining a ratio of horizontal gradients to vertical gradients, and calculating the coefficients based on the first variable and the ratio.

The invention can also include a method of adjusting tone scale of a digital image that includes blurring a plurality of neighboring pixels from a digital image input signal, filtering a pixel of the neighboring pixels using weighting that is dependent upon coefficients of the neighboring pixels and generating a pedestal signal based on the filtering and blurring.

ADVANTAGES OF THE INVENTION

One advantage of the invention is that the tone scale function application process is relatively fast. Further, the image detail is preserved while the image macro-contrast is adjusted. In addition, the detail is preserved without reference to a specific detail size range (in contrast to most single linear filter approaches) and artifacts are prevented.

BRIEF DESCRIPTION OF THE DRAWINGS

The foregoing and other objects, aspects and advantages will be better understood from the following detailed description of a preferred embodiment of the invention with reference to the drawings, in which:

FIGS. 8A–D are arrangements of the ARF coefficients for the four two-dimensional single-pass ARFs;

FIG. 11 is a schematic architectural diagram of the first signal-pass ARF with non-separable kernel;

FIG. 15 is a schematic architectural diagram of the first signal-pass separable ARF;

DETAILED DESCRIPTION OF PREFERRED EMBODIMENTS OF THE INVENTION

The present invention can utilize, for example, a digital image of size 1024 pixels by 1536 pixels, although those skilled in the art will recognize that digital images of different dimensions may be used with equal success. The origin of the digital image may be from any number of sources without deviating from the scope of the present invention. The digital image may be a scan of a photographic negative, a radiographic image, or a photographic positive (including motion picture films). In addition, the digital image may originate with digital capture from a digital camera or the digitization of an analog image signal, such as a video NTSC (neutral tone scale converter) signal.

Figure 1:
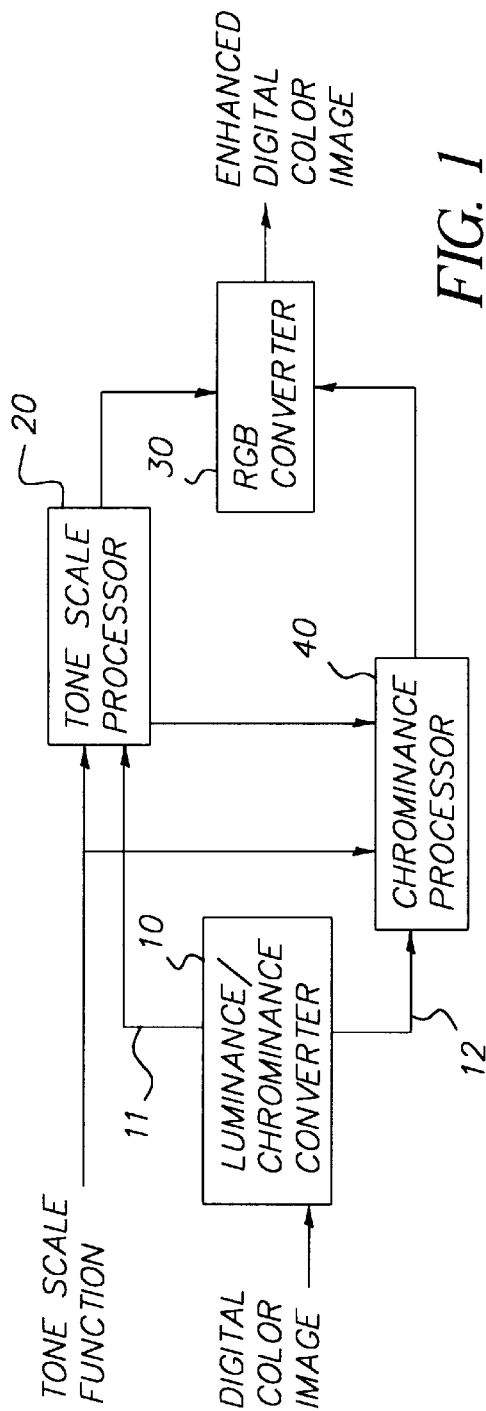
FIG. 1 is a schematic architectural diagram of one embodiment of the invention.

The inventive ARF (adaptive recursive filter) tone scale function application process utilizes the basic flow diagram show in FIG. 1 to apply a tone scale function to a digital image channel. A digital color image, typically in an RGB color space consisting of separate red, green, and blue image channels, is transformed to a luminance-chrominance color space by a color space matrix transformation (e.g., luminance/chrominance converter 10) resulting in a luminance image channel neu 11 and two chrominance image channels gm and ill 12. In a preferred embodiment, the present invention operates on only the luminance channel or individually on each chrominance channel, for example red, green or blue. The transformation from a set of red, green, and blue channels to a luminance and two chrominance channels may be accomplished by matrix multiplication (e.g., the matrix rotation given by Equation A1), for example.

The purpose for the rotation into a luminance-chrominance space is to isolate the single channel upon which the tone scale function operates. A film scanner records (for each pixel) the red, green, and blue printing density. These three values can be thought of as a pixel's location in three-dimensional space. An axes rotation can be performed with the luminance/chrominance converter 10 as shown in equation A1.

$$\begin{bmatrix} neu \\ gm \\ ill \end{bmatrix} = \begin{bmatrix} \frac{1}{3} & \frac{1}{3} & \frac{1}{3} \\ -\frac{1}{4} & \frac{1}{2} & -\frac{1}{4} \\ -\frac{1}{2} & 0 & \frac{1}{2} \end{bmatrix} \times \begin{bmatrix} r \\ g \\ b \end{bmatrix} \quad (A1)$$

This matrix rotation provides for a neutral axis, upon which r=g=b, and two color difference axes (green-magenta and illuminant).

An appropriate choice of tone scale functions used for dynamic range compression is the neutral luminance channel. Alternatively, transformations other than the U-space matrix, such as a 3 dimensional LUT, may be used to transform the digital image into a luminance-chrominance form, as would be known by one ordinarily skilled in the art given this disclosure.

The luminance image channel, neu, is then input to a detail preserving tone scale function processor 20. The purpose and goal of the tone scale processor 20 is to allow a tone scale function to adjust the macro-contrast of the digital image channel but preserve the detail content, or texture, of the digital image channel. The strategy by which this goal is accomplished may be observed in FIG. 2, discussed below. The chrominance channels are processed conventionally by the conventional chrominance processor 40. The chrominance processor 40 may modify the chrominance channels in a manner related to the tone scale function. For example, U.S. Pat. No. 6,438,264, based on application Ser. No. 09/224,028, filed on Dec. 31, 1998 (incorporated herein by reference), describes a method of modifying the chrominance channels related to the slope of the applied tone scale function. The operation of the chrominance processor is not central to the present invention, and will not be further discussed.

After the present invention performs its operations, the digital image is preferably transformed back into RGB color space by an inverse color space matrix transformation (RGB converter 30) for permitting printing a hardcopy or display on an output device.

Figure 2:
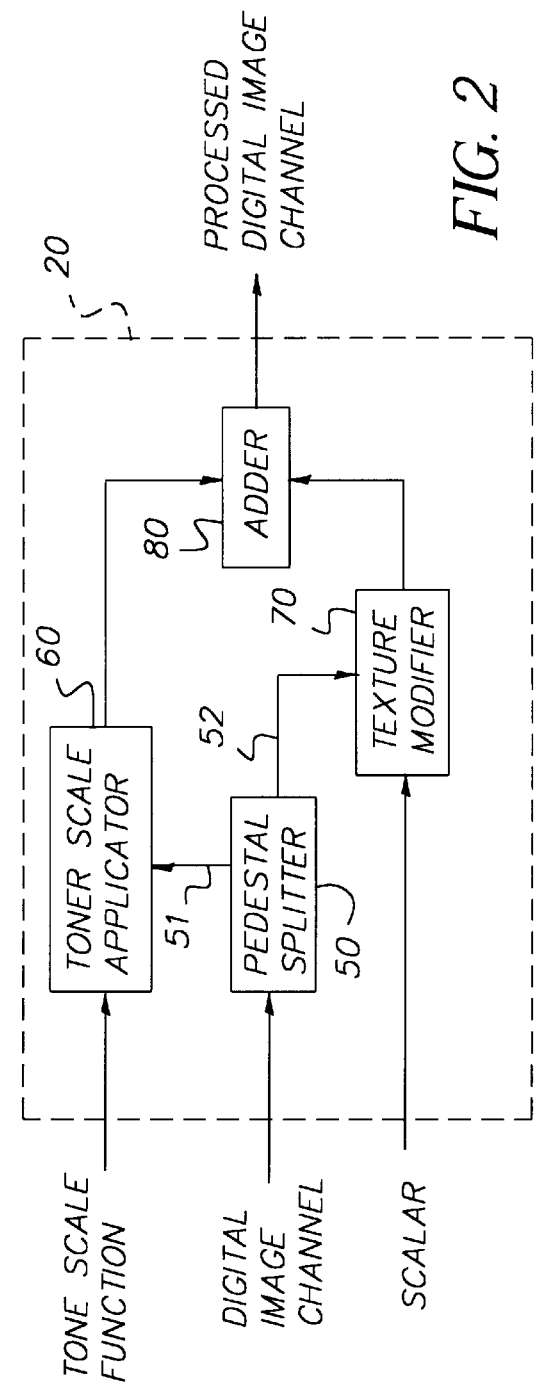
FIG. 2 is a schematic architectural diagram of one embodiment of the invention.

Referring now to FIG. 2, the digital image channel neu input to the detail preserving tone scale function applicator 11 is expressed as the sum of the pedestal signal $neu_{ped}$ the texture signal $neu_{txt}$ and a noise signal $neu_n$:

$$neu = neu_{ped} + neu_{txt} + neu_n \quad (1)$$

If the noise is assumed to be negligible, then:

$$neu = neu_{ped} + neu_{txt} \quad (2)$$

Within the tone scale processor 20, the luminance portion of the digital image channel output by the luminance/chrominance converter 10 is divided into two portions by a pedestal splitter 50, to produce a pedestal signal 51 and a texture signal 52, as described in detail below.

Figure 3:
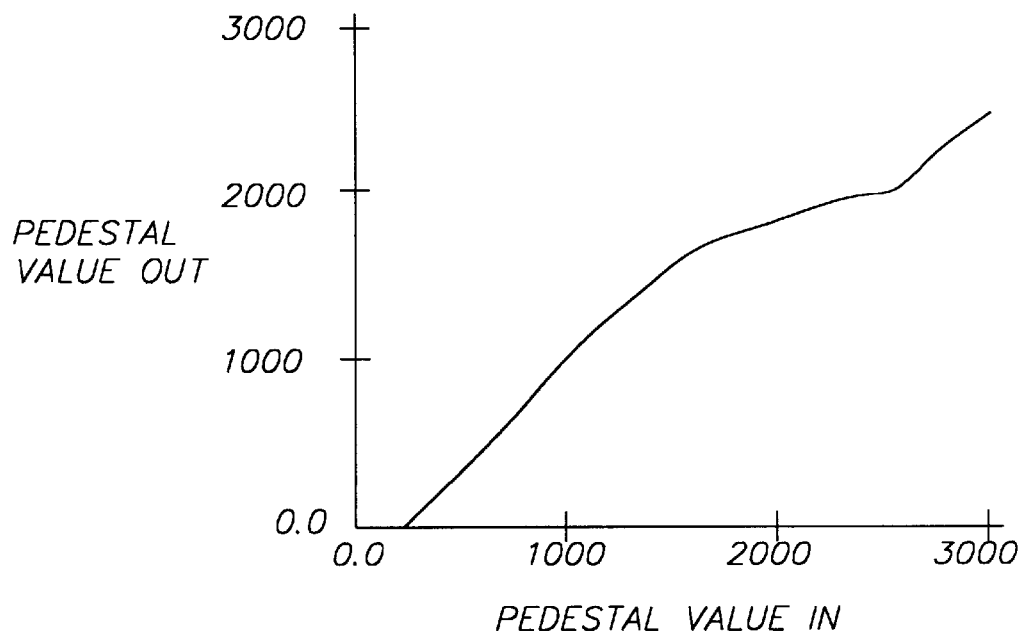
FIG. 3 is a graph illustrating an example tone scale function.

The tone scale function is applied to the pedestal signal 51 by a tone scale applicator 60 in order to change the characteristics of the image for image enhancement. The tone scale function may be applied for the purposes of altering the relative brightness or contrast of the digital image. The tone scale applicator 60 is implemented by application of a look up table (LUT), to an input signal, as is well known in the art. An example tone scale showing a 1 to 1 mapping of input values to output values is illustrated in FIG. 3.

The texture signal 52 may be amplified by a texture modifier 70 if desired, or altered in some other manner as those skilled in the art may desire. This texture modifier 70 may be a multiplication of the texture signal by a scalar constant. The modified texture signal and the modified pedestal signal are then summed together by an adder 80, forming a transformed image channel. The addition of two signals by an adder 80 is well known in the art. This process may also be described by the equation:

$$neu_p = f(neu_{ped}) + neu_{txt} \quad (3)$$

where $f(\ )$ represents the tone scale function and $neu_p$ represents the processed digital image channel having a reduced dynamic range. The detail information of the digital image channel is well preserved throughout the process of tone scale application.

The pedestal splitter 50 decomposes the input digital image channel neu into a "pedestal" signal 51 $neu_{ped}$ and a "texture" 52 signal $neu_{txt}$, the sum of which is equal to the original digital image channel (e.g., luminance signal) 11. The operation of the pedestal splitter 20 has a great deal of effect on the output image. The pedestal splitter applies a nonlinear adaptive recursive filter (ARF) in order to generate the pedestal signal. As a result of the nonlinearity of the ARF, Fourier frequency analogies are at best only approximate. The pedestal signal 51 $neu_{ped}$ is conceptually smooth except for large changes associated with major scene illumination or object discontinuities. The texture signal 52 $neu_{txt}$ is the difference of the original signal and the pedestal signal. Thus, the texture signal is comprised of detail.

Despite what is shown in FIG. 1, it is not a requirement that a luminance channel undergo the modification by the tone scale processor 20. For example, each color channel of an RGB image could undergo this processing, or a monochrome image could be transformed by this process as well. However, for purpose of the remainder of this application it is assumed that only the luminance channel, specifically, the neutral channel neu, will undergo processing by the detail preserving tone scale function applicator.

One benefit of the process herein described resides in the formulation of the filtering process implemented by the ARF filter pedestal splitter 50. While the ARF filter residing in the pedestal splitter 50 may appear similar to an IIR filter (in that the desired level of blur can be adjusted without changing the number of multiplications required to calculate the blurred pixel value), the pedestal splitter 50 is fundamentally different than a conventional IIR filter. More specifically, the pedestal splitter 50 is space-variant, and its characteristics conform to the local structure of the image. For this reason, a brief review of the structure of an IIR filter is presented below to contrast the inventive adaptive recursive filter residing in the pedestal splitter 50.

The general formula for a recursive causal system may be described by equation (4) (J. Proakis, and D. Manolakis, *Digital Signal Processing: Principles, Algorithms, and Applications*, Macmillian Publishing Company, New York, 1992, incorporated herein by reference).

$$y(n) = \sum_{k=1}^{N} a_k y(n-k) + \sum_{k=0}^{M} b_k x(n-k) \qquad (4)$$

In equation (4), x(n) represents the input signal and y(n) represents the output signal. The integers N and M determine the number of samples of the input and output signal that contribute to the present value of the output signal. The coefficients $a_k$ and $b_k$ represent the weights that are multiplicatively applied to samples of the past output signal and the input signal, respectively. The collection of coefficients $a_k$ and $b_k$ may be referred to as a digital filter. Because $a_k$ and $b_k$ are used as multiplicative factors in equation (4), these coefficients are also referred to as weights.

Assuming that $a_k$ and $b_k$ remain constant for all n, then the causal system is a linear space-invariant causal system, and the system may be further classified as being FIR (finite impulse response) or IIR (infinite impulse response.) If all values of $a_k$ equal 0, the system is FIR. For all FIR systems, y(n>M)=0 when x(n) is an impulse occurring at n=0. However, if any of the $a_k$ are not equal to 0, then the duration of the response in y(n) to an impulse input is infinite in duration. This type of system is IIR.

For most image processing tasks that require the use of a digital filter, it is desirable that the filter has zero phase response. This ensures that the general location of structures in a digital image will not migrate spatially with application of the filter. Symmetric FIR systems in the form of $$y(n) = \sum_{K=-M}^{M} b_k x(n-k)$$

where $b_k = b_{-k}$ have the property of zero phase response. However, in order to achieve a large degree of blurring, many calculations are involved because the number of $b_k$ coefficients becomes large.

The advantage of implementing an IIR system is that the effective blur size may be very large for small values of N (e.g. N=1). Similar levels of blur in an FIR system require large values of M. Since processing time is directly related to the number of samples required to calculate each y(n), an IIR system may implement large amounts of blur at significant time savings compared to similar levels of blur with an FIR system. However, IIR systems do not naturally have the desirable quality of zero phase response.

In order to remove undesired phase shift, a second stage of filtering must be performed in the opposite direction. Essentially, this second filtering stage creates another phase shift that cancels the first. This second stage may be an allpass filter that simply induces another phase shift, or it may be simply the reverse of the original filter.

To the contrary, the inventive adaptive recursive filter (ARF) has been developed for smoothing images in which the values of the $a_k$ and $b_k$ coefficients vary depending upon the local structure of the image. Thus, the ARF is a nonlinear causal filter that cannot be described by typical analysis, such as Fourier analysis. The ARF smoothes the input digital image channel by evaluating an equation similar to Equation 4 in which the values of the $a_k$, and $b_k$ coefficients vary depending upon the local structure of the blurred image signal. Varying the coefficients allows the system to blur less in the neighborhood of the edges, and, after four passes of the ARF, creates a pedestal signal.

Thus, the term "adaptive" in regard to the inventive filter design refers to the construction of a filter whose weights vary in accordance with the structure in a neighborhood of the filter position. In other words, the invention filters the digital image signal through a filter having coefficients that are dependent upon statistical parameters of pixel values in the surrounding neighborhood of the particular pixel being filtered. The term "recursive" refers to a filter whose implementation involves recursion, that is, the present value of the output signal is dependent upon previously calculated values of the output signal, as in equation (4) where at least one $a_k$ is non-zero. Varying the coefficients allows the system to blur less in the neighborhood of edges, creating a pedestal signal (e.g., bottom trace in FIG. 4).

The neighborhood size is related to the calculation of gradients on the control signal. Note that this is condition is merely exemplary, and the neighborhood size may be selected to be independent of the adaptive recursive filter (ARF) size. Conceptually, the optimal neighborhood size is equal to the size of the ARF. However, since the neighborhood originated from the control signal (which is a blurred version of the digital image channel), the effective neighborhood size with regard to the original digital image channel is larger than the size of the ARF.

Figure 4:
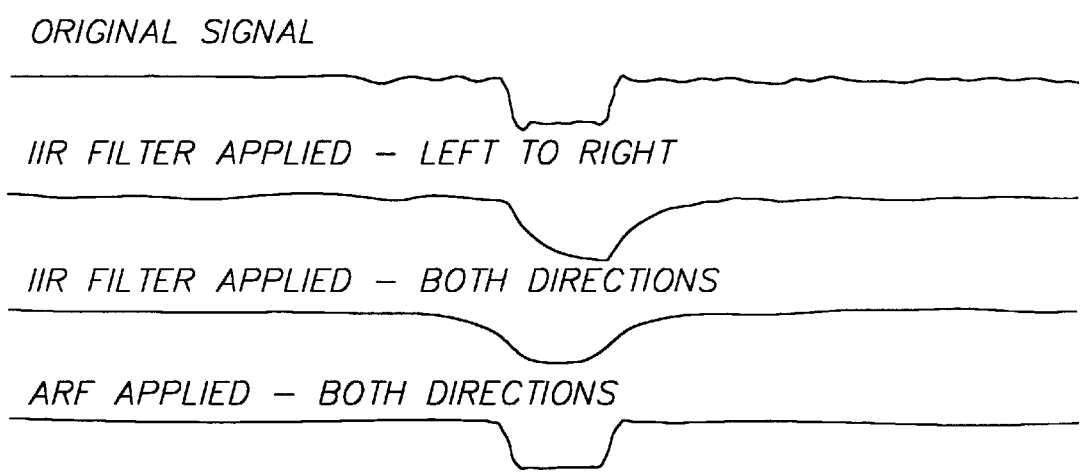
FIG. 4 shows example signal traces that illustrate the ARF.

Consider the example signals shown in FIG. 4 where exemplary signal traces illustrate the ARF. A 140 pixel signal taken from a trace of an image is shown. The top trace is an actual trace from an image. The second trace is a plot of the original signal after being operated on by a linear IIR filter in only one direction. Notice that the phase shift appears to smear the signal to the right. The third trace shows the result after applying the same linear filter to the second trace, in the opposite direction. Notice that the phase shift problem has disappeared. The bottom trace is a plot of the same image pixels after the four-pass ARF has been applied to the image signal. Relative to the top trace, the detail has been smoothed, while the discontinuities have been preserved.

The application of equation (4) with M=0, N=1, $a_1$=0.7 and $b_0$=0.3 results in the second trace, obviously exhibiting evidence of phase shift (the signal appears to have been dragged to the right.) This IIR system may be restated with the following equation:

$$y_1(n)=0.7y_1(n-1)+0.3x(n) \tag{5}$$

Figure 5A:
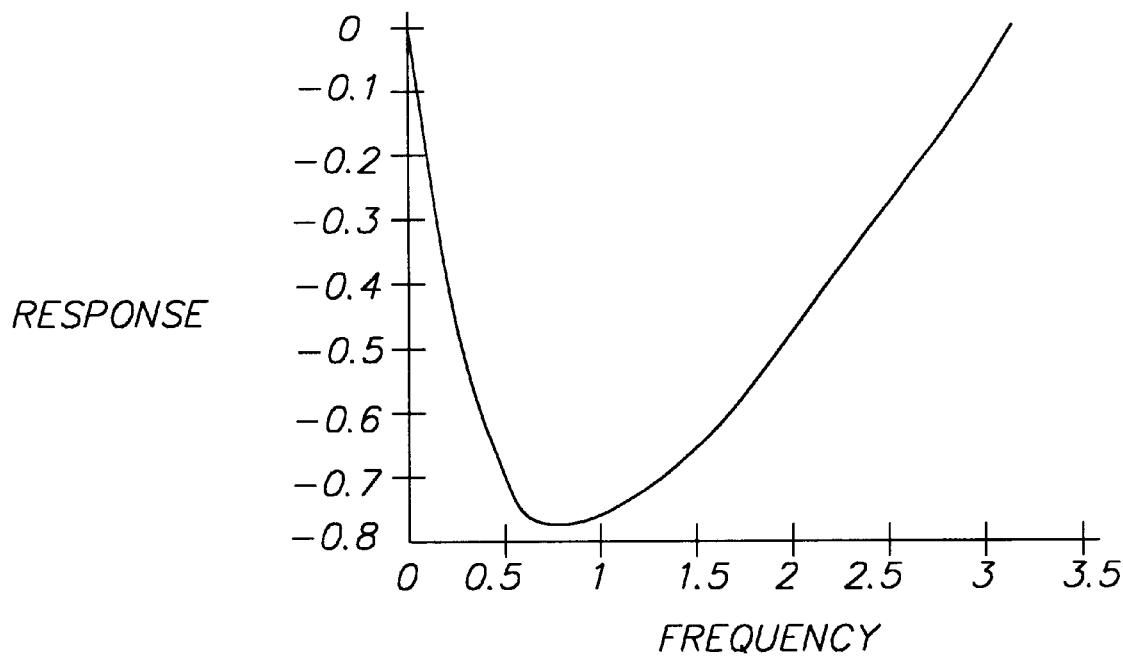
FIG. 5A is a graphical illustration of phase response of the IIR filter.
Figure 5B:
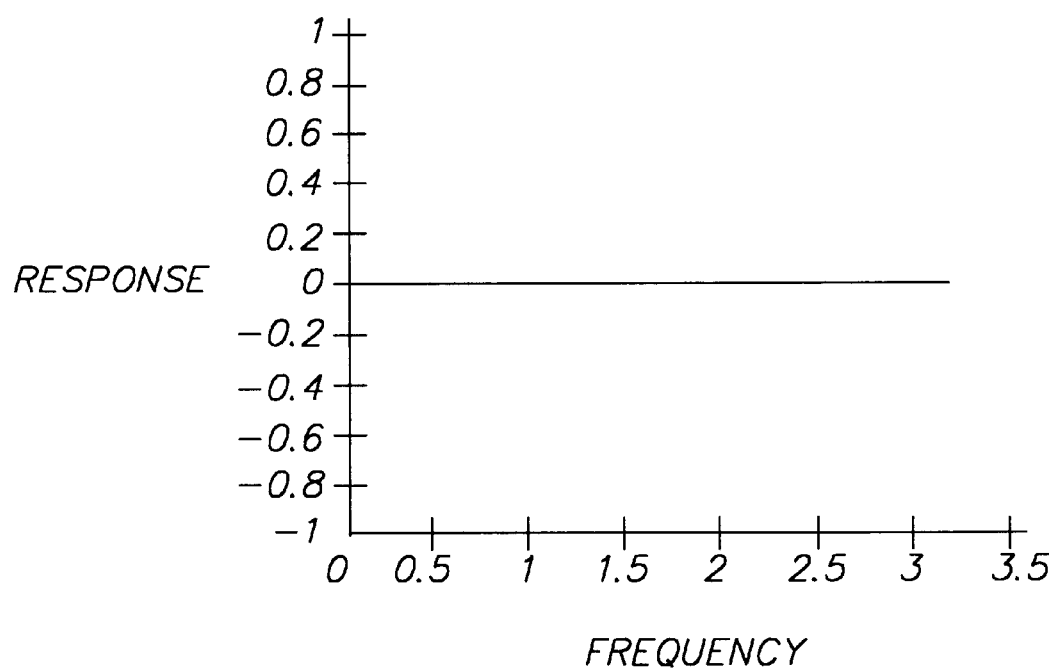
FIG. 5B is a graphical illustration of the phase response of the forward and reverse filters.

The non-zero phase response of equation 5 may be seen in FIG. 5A and FIG. 5B. In FIG. 5A, the phase response of the IIR filter is described by equation (5). In FIG. 5B, the phase response of the combination of the forward equation (5) and reverse equation (6) filters is shown. The third trace in FIG. 4 is the result of applying the IIR filter is both directions (forward and reverse.) Thus, the forward application of the filter is accomplished by first applying equation (5) from left to right. The reverse direction is computed by applying from right to left the equation:

$$y_2(n)=0.7y_2(n+1)+0.3y_1(n) \tag{6}$$

This signal exhibits no phase shift, as seen in FIG. 5B. Finally, the bottom signal is the result of applying the ARF to the input signal. In this case, the output signal has been smoothed, but a large discontinuity was preserved.

Figure 6:
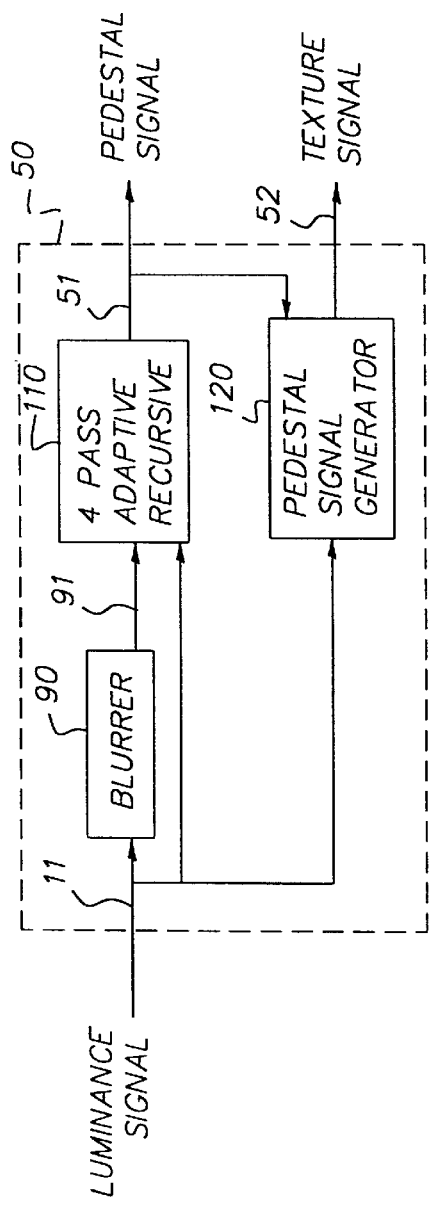
FIG. 6 is a schematic architectural diagram of the pedestal splitter.

An exploded view of the pedestal splitter 50 is shown in FIG. 6. The pedestal splitter includes a blurrer 90 to generate a smoothed signal to act as the control input of the four-pass ARF 110. The four-pass ARF also accepts the original digital image luminance channel neu 11 and outputs the pedestal signal $neu_{ped}$ 51. The texture signal $neu_{txt}$ 52 is generated by the pedestal signal generator 120 subtracting the pedestal signal $neu_{ped}$ 51 from the digital image channel neu 11.

The neu channel 11 is also directly passed as the signal input of the four-pass ARF 110, which outputs the pedestal signal $neu_{ped}$. The difference of this signal and the original neutral channel neu is the texture signal $neu_{txt}$ in equation (2).

The blurrer 90 represents the convolution of the digital image channel with an FIR lowpass filter. The purpose of the output blurred image signal, referred to as z(i,j), is to act as a control signal from which local coefficients of the ARF are derived. It is desirable that the control signal has only low levels of noise in order to avoid rapid switching of the characteristics of the ARF. The blurred image signal is equivalent to the digital image channel minus the high frequency information. The FIR filter is generated by sampling a Gaussian probability density function and is known as a Gaussian filter. The equations used to generate the kernel values of the Gaussian filter are given below.

A convenient choice for the lowpass filter $h_G(k)$ is constructed from samples of a Gaussian distribution. An advantage of the two dimensional Gaussian filter is that it is separable into horizontal and vertical components. The Gaussian filter may be specified by only the standard deviation of the Gaussian distribution, assuming that the total number of samples is approximately equal to six standard deviations. The unnormalized one-dimensional Gaussian filter may be expressed as:

$$h_U(m) = \sum_{k=-0.5(l-1)}^{0.5(l-1)} \delta(k-m)\exp\left(-\frac{(m-c)^2}{2\sigma^2}\right)$$

Where 1 is an odd integer equal to approximately 6σ,c=(1-1)/2, and δ(x) is the delta function. The delta function δ(x)=1 for x=0, and δ(x)=0 for all other values x. The Gaussian filter $h_G(m)$ is obtained by normalizing $h_U(m)$ such that the sum of the filter coefficients (and consequently the DC gain) equals 1.0.

In a preferred embodiment, the value of σ used to generate the Gaussian filter is 2 pixels per standard deviation. Note that if σ is chosen to be 0.0, then the Gaussian filter defaults to the delta function. Because of the well-known fact that convolution of a signal with a delta function does not change the signal, selection of σ=0.0 is equivalent to setting the blurred image signal equal to the digital image signal. Many other types of filtering procedures could be substituted for the Gaussian filter in the blurrer 90 of FIG. 6. There are many methods of blurring a digital image channel besides blurring with a Gaussian filter that are well known in the art (e.g. blurring with an IIR filter as described by Matama, supra). Other common nonlinear operations such as morphological blurring or the median filter may also be used to blur the digital image channel. Any method of blurring a digital image channel that has a smoothing effect on the digital image channel may be performed by the blurrer 90 without deviating significant from the scope of the invention.

The blurred image signal z(i,j) 91 is applied to the control signal input of the four-pass adaptive recursive filter 110. In addition, the digital image channel neu 11 is applied to the signal input of the four-pass ARF. The four-pass ARF 110 applies to the digital image channel a recursive blurring that is adaptive based upon image content, as determined from the control signal z(i,j). In general, the four-pass ARF applicator blurs the digital image channel more in regions of the image that are relatively smooth, and less in regions of the image neighboring large occlusion edges. The four-pass ARF applicator utilizes statistics derived from the control signal z(i,j) in order to adjust the characteristics of the ARF depending on position. The signal output from the four-pass ARF applicator is the pedestal signal $neu_{ped}$ 51, a signal that is conceptually smooth except at the locations of large occlusion boundaries.

Thus, as shown in FIG. 6, the pedestal signal 51 is applied an input of the texture signal generator 120, along with the digital image channel 11. The output of the texture signal generator 120 is the texture signal 52, which is produced by subtracting the pedestals signal 51 (output from the four-pass ARF applicator 110) from the digital image channel 11. In equations form this may be expressed as:

$$neu_{txt}(i,j)=neu(i,j)-neu_{ped}(i,j) \tag{7}$$

where $neu_{txt}$ (i,j) is the value of the texture signal at the (i, j)$^{th}$ pixel location, neu(i,j) is the value of the digital image channel at the (i, j)$^{th}$ pixel location, and $neu_{ped}$ (i,j) is the value of the pedestal signal at the (i, j)$^{th}$ pixel location.

Figure 7:
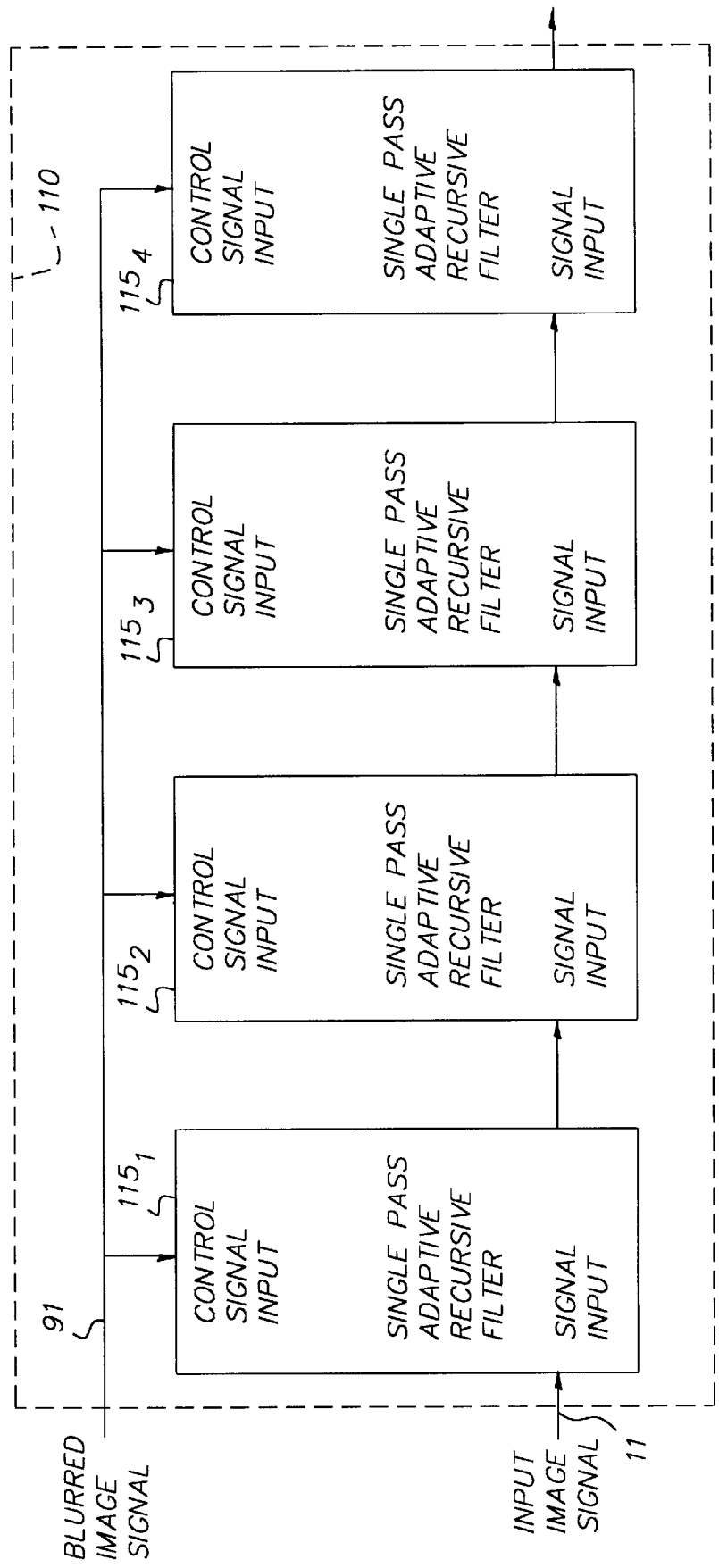
FIG. 7 is a schematic architectural diagram of the four-pass ARF.

Referring to FIG. 7, there is illustrated an exploded view of the four-pass ARF applicator 110. As implied by the name, a four-pass ARF consists of four single-pass ARF stages $115_1$–$115_4$. The blurred image signal z(i,j) is applied to the control signal input of the first single-pass ARF applicator $115_1$. The input digital image channel neu 11 is applied to the signal input of the first single-pass ARF. For convenience of notation, the signal input of the four-pass ARF will be referred to as x(i,j). Thus, x(i,j)=neu(i,j). The operation of a single-pass ARF is to apply to an image signal an equation similar in form to equation (4), whose coefficients are derived for each image location (i,j) from an analysis of the control signal.

Four passes of the ARF are required because a recursive filtering system induces a phase distortion in the output image relative to the original image. In order to cancel this effect, both the filter and direction are reversed in a second pass of the recursive filter. Thus, in order to generate a pedestal signal without phase distortion, a total of four passes of the adaptive recursive filter must be applied. These four passes insure that every horizontal row of pixels has been filtered from left to right and from right to left. In addition each vertical column of pixels must be filtered from top to bottom and from bottom to top. As previously mentioned, the pedestal signal output by the four pass ARF applicator 110 is conceptually smooth except for large discontinuities occurring at large edges in the image.

The operation of a single-pass ARF applicator to is to apply an ARF, whose coefficients are derived from an analysis of the controls signal to an image signal. The same control signal z(i,j) is utilized by each single pass ARF applicator $115_{1-4}$ in order to determine the weights $a_k$ and $b_k$ that will be applied to each location of the input image signal. The output of the single pass ARF applicator $115_1$ is an image signal that has been smoothed, however; there is some phase delay to the smoothing. The output from the first single pass ARF applicator $115_1$ is applied to the input of the second single pass ARF applicator $115_2$. Similarly, the output from the second single pass ARF applicator $115_2$ is supplied to the input of the third single pass ARF applicator $115_3$. As illustrated in FIG. 7, this process continues until the output of the fourth single pass ARF $115_4$, $y_4(i, j)$, is obtained.

Thus, the four-pass ARF has four single-pass ARF stages. A single-pass ARF consists of the coefficients $a_k$ and $b_k$, as well as a mechanism for determining their values based upon local image structure as determined by an analysis of the local structure of the control signal z(i,j). Any number of coefficients $a_k$ and $b_k$ may be used for an ARF. The arrangement of the coefficients $a_k$ and $b_k$ form the ARF neighborhood of the pixel undergoing filtering. For the purpose of this patent application, two different ARF neighborhoods will be presented. The first is a two-dimensional neighborhood consisting of four coefficients. This ARF neighborhood is referred to as the two-dimensional ARF. The second, which has the advantages of simplicity and speed, is a one-dimensional neighborhood consisting of only two coefficients, referred to as the separable ARF.

The formulation of the first two-dimensional single-pass ARF may be expressed by the equation:

$$y_1(i,j)=a_1y_1(i-1,j)+a_2y_1(i-1,j-1)+a_3y_1(i, j-1)+b_0x(i, j) \quad (8)$$

where $y_1(i, j)$ represents the value of the output signal at the $(i, j)^{th}$ pixel location, and x(i,j) represents the value of the digital image channel neu at the $(i, j)^{th}$ pixel location. Notice that equation (8) is a two-dimensional extension of equation (4). The selection of the weighting coefficients $a_1$, $a_2$, $a_3$, and $b_0$ is discussed below. At each location in the image, the values of these weights are re-calculated.

Referring to FIGS. 8A–8D, there is illustrated the arrangement of the filter coefficients in a 5 row by 5 column illustrative image with the image origin in the upper left corner. More specifically, FIGS. 8A–8D illustrate the operation of each individual ARF $115_{1-4}$ in the four-pass ARF 110. The pixel locations referenced by equation (8) form a square neighborhood, 2 pixels by 2 pixels. The filtering process begins in the corner that places the $b_0$ coefficient closest to the image center and proceeds in the direction toward the opposite corner. This ensures the existence of as many as possible of the $y_1(i_0,j_0)$ terms. In the case of equation (8), the filtering process begins in the upper left corner of the image and proceeds across (from left to right) each row of pixels and down each column. Thus, throughout the filtering process, the filter position changes, but the ARF covers 4 pixel locations.

When executing the single-pass ARF, the value of $x(i_0 j_0)$ is substituted for any value of $y_1(i_0 j_0)$ that is not known when it is required for the calculation of $y_1(i, j)$. In the position shown in FIGS. 8A–8D, the $a_k$ coefficients are used to scale the values $y_1(0,0)$, $y_1(0,1)$, and $y_1(1,0)$. The $b_0$ coefficient is used as a scaling factor on the value of x(1,1), The value of $y_1(1,1)$ is then set equal to the sum of all the scaled values falling under the $a_k$ and $b_0$ coefficients. This process is again illustrated in FIG. 9.

Figure 9:
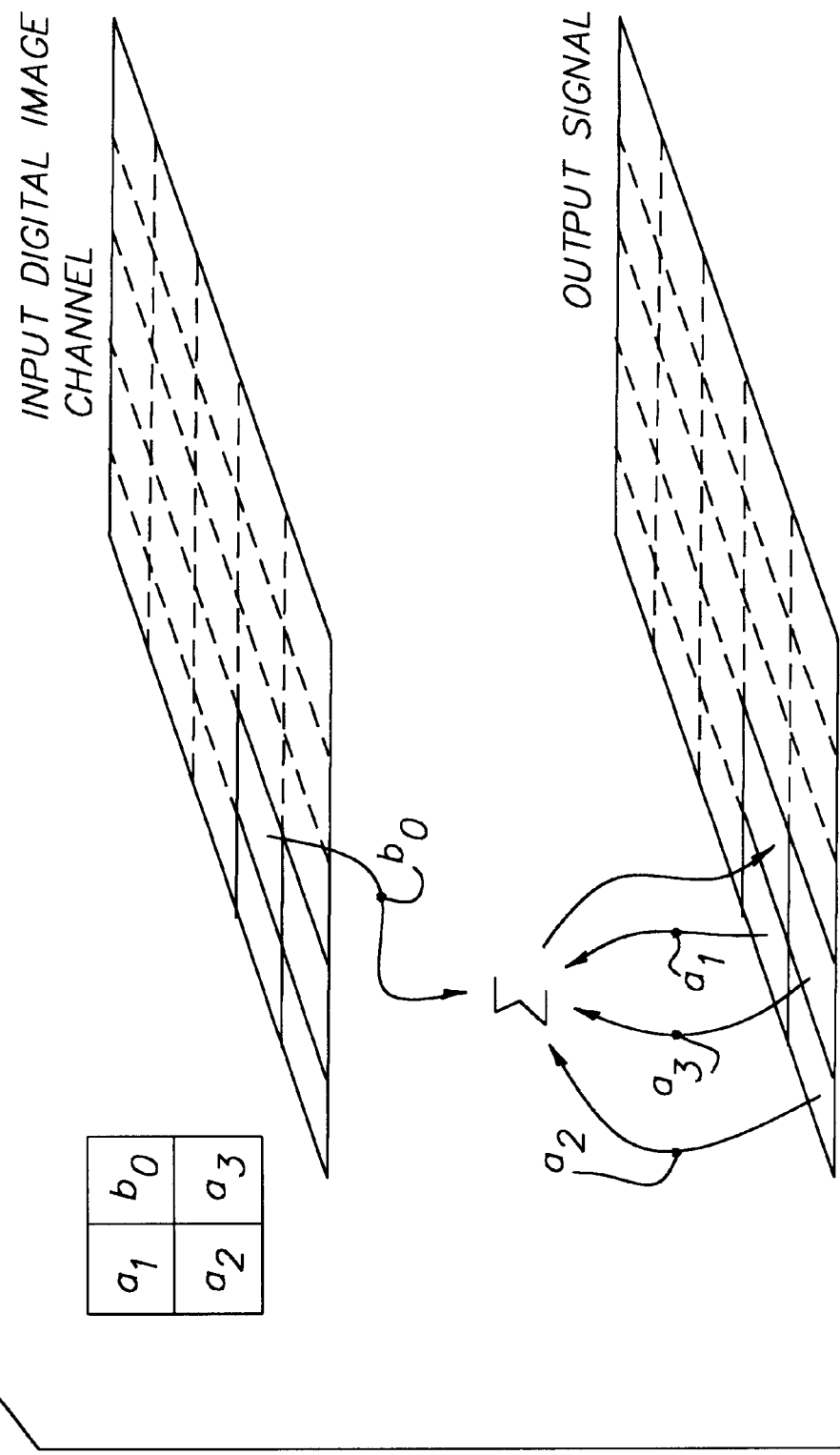
FIG. 9 is a planar illustration of the application of an ARF at a single position of a digital image channel.

More specifically, FIG. 9 is an illustration of the application of an ARF at a single position of a digital image channel. First, the ARF coefficients $a_1$, $a_2$, $a_3$, and $b_0$ are determined. Next, the coefficients are multiplied by the pixel values of the input digital image channel (in the case of $b_0$) and the output signal (in the case of $a_1$, $a_2$, and $a_3$.) These values are summed to generate the value of the output signal for that position of the ARF.

This illustration refers to the execution of equation (11) at a single position on the digital image channel. As shown, the calculation of each sample in the output signal y1 (i,j) requires three previous values of the output signal as well as the present value of the input signal. In the second single-pass ARF applicator $115_2$, the output signal y2 (i,j) is generated by evaluating the following equation:

$$y_2(i,j)=a_1y_2(i+1,j)+a_2y_2(i+1, j+1) +a_3y_2(i,j+1)+b_0y_1(i,j) \quad (9)$$

In FIG. 8B, the filtering process begins in the lower right hand corner and proceeds across (from right to left) each row of pixels and up each column. The effect of the second single-pass ARF applicator is to increase the overall level of blurring relative to the input image signal neu as well as to (approximately) cancel the phase distortion induced by the first single-pass ARF applicator.

Note that the values of $a_1$, $a_2$, $a_3$, and $b_0$ at a particular location of the digital image channel are not necessarily the same between the two passes since the values of the coefficients are recalculated with each pass. In a faster implementation, the coefficients may be calculated only once, and then stored for use in subsequent passes in order to save processing time. As a further alternative embodiment, the coefficients may be calculated on the first vertical pass and then stored for use on the second vertical pass. Likewise, on the first horizontal pass, the coefficients could be generated and used for each of the two passes. The input to this second single-pass ARF applicator is the output signal of the first single-pass ARF applicator. In addition, third and fourth single-pass ARF applicators are serially applied to the output of the second single-pass ARF applicator, as illustrated in FIG. 7. These two additional filtering stages process the image signal with the single-pass ARF beginning from the final two remaining corners of the image, again creating a phase shift on the third pass and approximately canceling the phase shift on the fourth pass.

The equations for the third and fourth single-pass ARF applicators and are given as follows:

$$y_3(i,j)=a_1y_3(i+1,j)+a_2y_3(i+1,j-1)+a_3y_3(i,j-1)+b_0y_2(i,j)+ab \quad (10)$$

$$(y_4(i,j)=a_1y_4(i-1,j)+a_2y_4(i-1,j+1)+a_3y_4(i,j+1)+b_0y_3(i,j)+ab \quad (11)$$

In FIG. 8C, the third single-pass ARF begins in the upper right corner of the image and proceeds across (from right to left) each row and down each column. Finally, the fourth signal-pass ARF begins in the lower left hand corner and proceeds across (from right to left) each row of pixels and up each column (FIG. 8D).

Notice by comparing FIGS. 6 and 7 that the signal output from the fourth pass of the adaptive recursive filter, $y_4(i, j)$, is the pedestal signal $neu_{ped}$ 51. Processing the image with the recursive filter originating from each of the four corners helps to ensure that the phase distortion will be minimal.

The ARF is a nonlinear filter because the coefficients $a_k$ and $b_k$ vary throughout the image. Therefore, all frequency analysis is approximate. However, it is important for purposes of this illustration to determine the ARF frequency response, assuming that the filter coefficients remain constant. Assuming $b_0=0.3, a_1=0.28, a_2=0.14$, and $a_3=0.28$, the magnitude of the frequency response of the four-pass ARF filter is given in FIG. 10.

Figure 10:
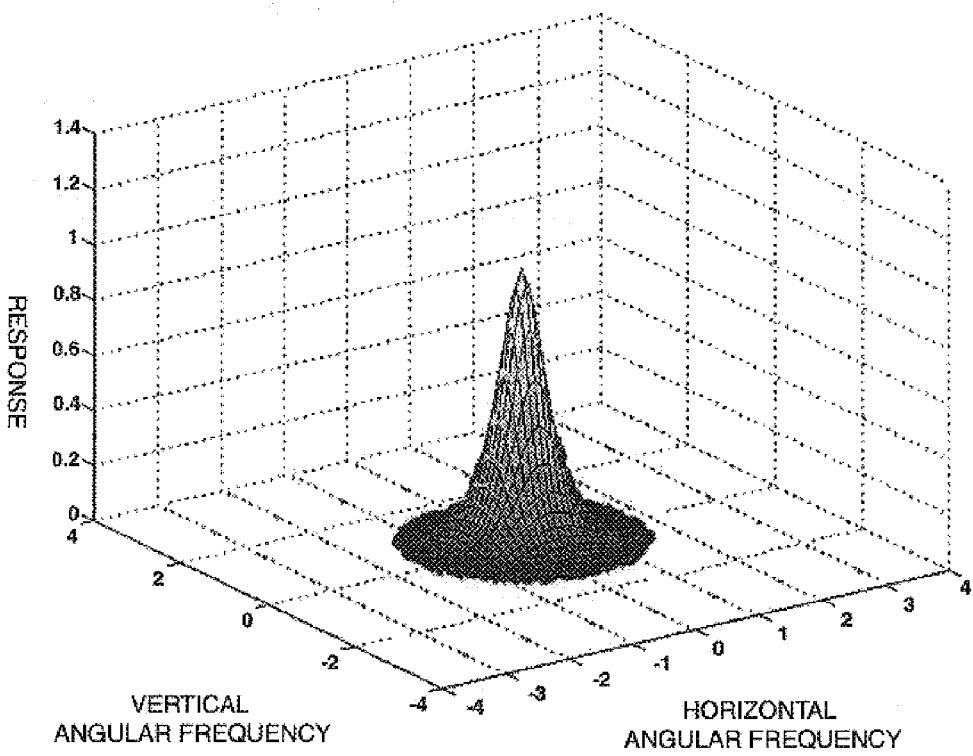
FIG. 10 is a graph illustrating the magnitude of the frequency response of the four-pass ARF (with the two-dimensional single-pass ARF), assuming that the filter coefficients remain constant.

More specifically, FIG. 10 illustrates the magnitude of the frequency response of the four-pass ARF (with the two-dimensional single-pass ARF), assuming that the filter coefficients remain constant. This indicates that for regions of the digital image channel that the ARF coefficients remain constant, the frequency response is nearly identical in all directions. The ARF weights are selected individually at each (i,j) location in the image.

This process is described with reference to FIG. 11, which illustrates an exploded view of a two-dimensional single-pass ARF, including the method for determining the ARF coefficients that is executed for each position of the ARF in the digital image channel. More specifically, FIG. 11 shows an exploded view of the first signal-pass ARF.

First, the local gradients $\Delta_h$ and $\Delta_v$ of a control image $z(i,j)$ (e.g., the blurred image signal 91) are determined using the gradients calculator 130. The minimum of these gradients, as determined by a minimum finder 132 $\Delta_{min}$, is passed through an alpha determiner 134 to attain the value of $\alpha$. Meanwhile, the ratio r of the local gradients is determined by a ratio calculator 138. The ratio $\gamma$ computed by the ratio calculator 138 is the ratio of the horizontal gradient to the vertical gradient, as described in further detail below.

The ARF coefficients are determined with $\alpha$ and r by the coefficients calculator 136. Finally, these coefficients are used to evaluate equation (8) (in the case of the first single-pass ARF) by multiplying the local pixel values of the signal input $x(i,j)$ and the signal output $y_1(i,j)$ in an output value calculator 140. For clarity, the derivation of the values of the single-pass ARF coefficients is described above with reference to the first single-pass ARF. However, one ordinarily skilled in the art would understand its application to the remaining ARF units.

Extending the description to the remaining passes of the ARF is as shown below. In order to have a DC gain of one, the filter weights are designed such that $a_1+a_2+a_3+b_0=1$. The general idea behind choosing the weights is to design the ARF such that less smoothing is performed as the filter approaches a large edge in the original digital image channel.

The adaptive smoothing of the digital image channel is advantageous for tone scale function application to a digital image channel for several reasons. Since the edges are left relatively unsmoothed, in those regions the pedestal signal $neu_{ped}(x,y)$ is very similar to the digital image channel $neu(x,y)$. Therefore, considering Equation 2, it can be seen that the texture signal $neu_{txt}(x,y)$ in edge regions will be nearly zero. This ensures that even after applying a tone scale function to the edge region of the pedestal signal $neu_{ped}(x,y)$ and adding the texture signal $neu_{txt}(x,y)$ to the result, the profile of the edge region in the processed digital image channel $neu_p(x,y)$ will still appear similar to the profile of the original signal $neu(x,y)$.

Alternatively, a non-adaptive smoothing of an edge region ensures that the pedestal signal $neu_{ped}(x,y)$ will appear quite smoothed relative to the original signal $neu(x,y)$. It follows that the texture signal $neu_{txt}(xy)$ will contain a great deal of modulation at the edge region. In this case, compressing the pedestal signal $neu_{ped}(x,y)$ and then summing the result to the texture signal $neu_{txt}(x,y)$ which contains a large amount of modulation from the original digital image channel $neu(x,y)$ will result in the creation of a ringing artifact in the processed digital image channel $neu_p(x,y)$.

Although, as described, it is desirable to perform only a small amount of blurring at edge regions, better image detail preservation is attained when relatively flat regions in the digital image channel receive a great deal of blurring. The ARF is capable of blurring relatively flat regions of the digital image channel a great deal, and regions of the digital image channel containing large edges receive only a small amount of blurring, if any.

The adaptive level of blurring that is a property of the Adaptive Recursive Filter is a highly advantageous property to have in a tone scale application algorithm.

Less smoothing is achieved by selecting $b_0$ to be nearly equal to 1.0. Another goal is that as the ARF approaches a large vertical edge, the desired effect is to blur in the direction along the edge (vertical), but not in the direction across the edge (horizontal).

The two design goals are now restated: 1. Blur more in the direction of least gradient (since gradient is an edge detector) 2. Attenuate overall blurring if both vertical and horizontal directions have high gradients.

For convenience, we define the weights as:

$$a_1=\alpha A \quad (12)$$

$$a_2=\alpha B \quad (13)$$

$$a_3=\alpha C \quad (14)$$

$$b_0=(1-\alpha) \quad (15)$$

In this framework, the $\alpha$ term is an overall attenuation of the blurring, rangeing from $0<=\alpha<1.0$. A particular pixel will not be blurred if $\alpha=0$ for that location of the ARF. The value $1-\alpha$ is the relative weight placed on the current pixel value of the input signal. Thus, as $\alpha$ decreases, more weight is placed on the current input value and the overall amount of local blurring decreases. (Consider the limiting case of $\alpha=0$. Then, a weight of 1.0 is placed on the current input value and no blurring occurs when evaluating (5).) A, B, and C are chosen to control the directionality of the filter. Also, the sum $A+B+C=1$. Satisfying these conditions will ensure $a_1+a_2+a_3+b_0=1$ (i.e. the average signal level is preserved.)

In order to select the values A, B, C, and $\alpha$, certain statistics are computed from the blurred image signal. These statistics comprise the local horizontal and vertical gradients. However, it should be noted that other measures of local image structure could be computed for the purpose of calculating the filter weights without significantly deviating from the scope of the present invention.

The gradients calculator 130 determines and outputs the horizontal and vertical gradients in the neighborhood of the filter position from an analysis of the control signal.

The control signal represents the neighborhood of the pixel being processed by the ARF because the control signal $z(x_0,y_0)$ represents a blurred digital image signal neu$(x_0,y_0)$. Thus, the value at each location of the control signal $z(x_0,y_0)$ is made up of a linear combination of the values of the corresponding pixel of the digital image channel neu$(x_0,y_0)$ and the pixels neighboring neu$(x_0,y_0)$. A Gaussian filter is used by the blurrer 90 to generate the control signal 90. The Gaussian filter size ranges from 5×5 to 15×15 pixels.

The weights of the ARF are determined from the control signal z(x,y) (i.e. a blurred version of the digital image channel neu(x,y)) rather from the digital image channel neu(x,y) because the control signal has much less noise than the original digital image channel. Noise will cause the ARF weights to vary rapidly, which is an undesirable property. Technically, if the gradients calculator 130 used a much larger window to estimate the local gradient, the digital image channel could be used as the control signal z(x,y), since the larger neighborhood over which the gradient is calculated could effectively do the same smoothing that was preformed by the blurrer 90.

The blurring performed on the digital image channel to create the control signal z(i,j) ensures that the gradient will vary smoothly across the image. The horizontal gradient, $\Delta_h(i, j)$, is simply equal to the absolute value of the difference of the pixel values of the smoothed image at the location of the filter kernel values $b_0$ and $a_1$ Similarly, the vertical gradient, $\Delta_v(i, j)$, is equal to the absolute value of the difference of the pixel values of the smoothed image at the location of the filter kernel values $b_0$ and $a_3$.

For example, in the case of the first pass of the adaptive recursive filter $$\Delta_h(i,j)=|z(i,j)-z(i,j-1)|$$

$$\Delta_v(i,j)=|z(i,j)-z(i-1,j)|$$

where $\Delta_h(i,j)$ and $\Delta_v(i,j)$ are local measures of the gradient of the control signal at the $(i,j)^{th}$ position, and z(i,j) is the value of the control signal at the (i,j)' position.

At any given location (i,j) the maximum finder 132 accepts as inputs the two measures of gradient $\Delta_h(i,j)$ and $\Delta_v(i,j)$ output from the gradients calculator 130. The output of the maximum finder 132 is $\Delta_{min}(i,j)$ the smallest gradient value at a given location.

Figure 12:
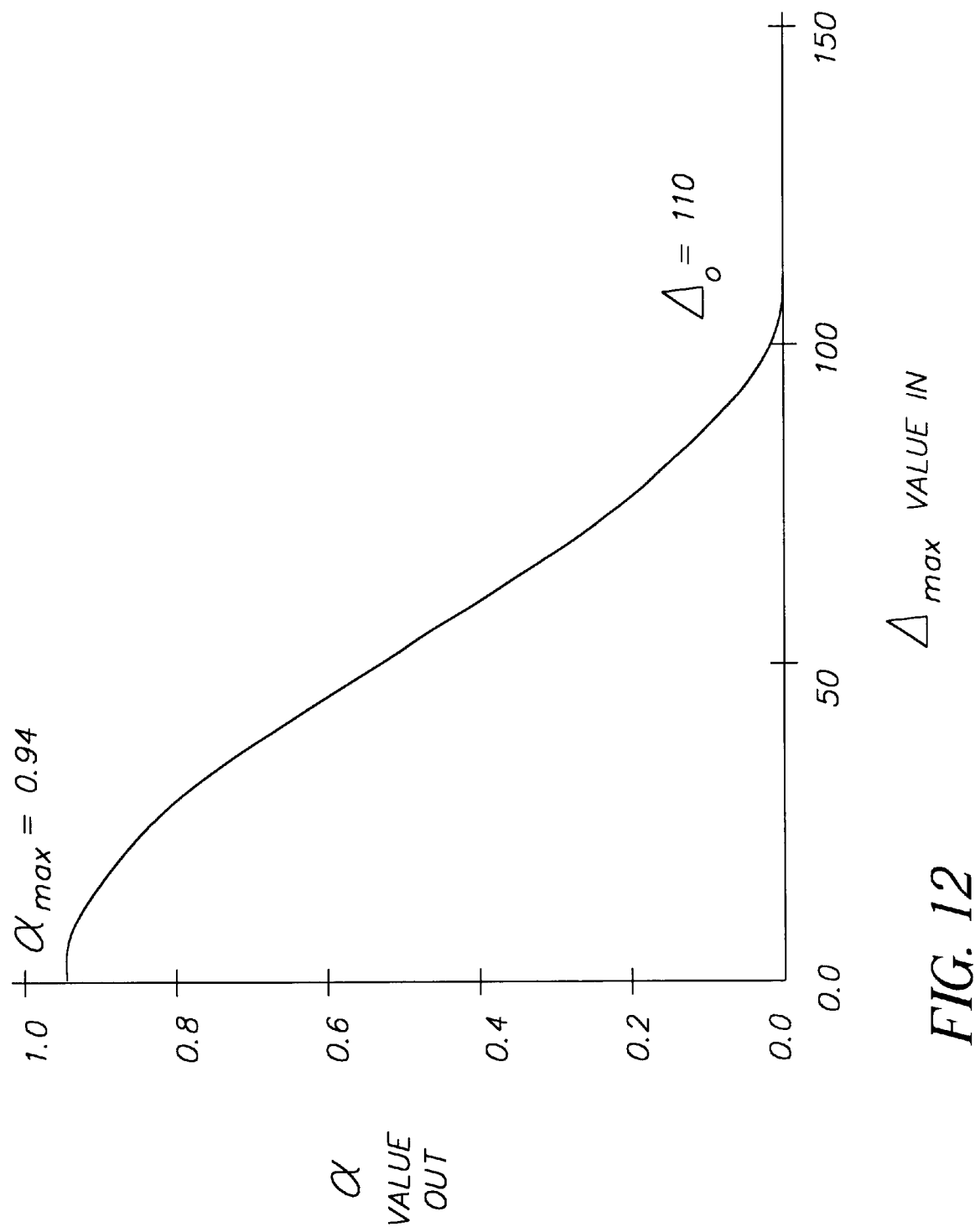
FIG. 12 is a graphical illustration of an example relationship between $\Delta_{min}$ (i,j) and $\alpha$.

The α term is generated by the alpha determiner 134 by passing the output of the gradients calculator $\Delta_{min}(i,j)$, through a look up table (LUT) such as the LUT in FIG. 12. The input to the LUT is $\Delta_{min}(i,j)$ and the output is α. Note that α is dependent upon position since it is derived entirely upon $\Delta_{min}(i,j)$. However; for convenience, the output is referred to as α rather than α(i,j).

The LUT illustrated in FIG. 12 is parameterized by two values. The first is $\Delta_0$, the minimum gradient value for which α=0. In the case of the LUT shown in FIG. 12, the value of the first parameter is 110. The second parameter is $\alpha_{max}$ the maximum possible value of α. This value essentially controls the maximum amount of blurring that will occur in very flat regions of the image. In the preferred embodiment, the value of $\alpha_{max}$ is 0.94.

The LUT is based on empirical experimentation (as remains constant throughout an entire image), although as would be known by one ordinarily skilled in the art given this disclosure, the LUT could be determined in an adaptive fashion for a given image or neighborhood of pixels.

In the present version of the process, the LUT used to determine the value of a corresponding to the value of $\Delta_{min}$ is defined by the following relationship:

If $\Delta_{min}(i,j)<=0.13\Delta_0-18$, then $\alpha=\alpha_{max}$ (18)

if $0.13\Delta_0-18 <\Delta_{min}(i,j)<\Delta_0$ then $\alpha=0.5\alpha_{max}(1+\cos(\pi(\Delta min\ (i,j)-0.13\Delta_0+18))$ Else α=0

Those skilled in the art will recognize, in light of this disclosure, that many other functions may be utilized to form the LUT that is applied by the alpha determiner 134. In general, the LUT should be monotonically decreasing. Also, the parameter $\Delta_0$ refers to the maximum allowable value of $\Delta_{min}(i,j)$ before the blurring is altogether stopped (since α=0 when $\Delta_{min}(i,j)>\Delta_0$). There exists a strong relationship between the value of $\Delta_0$ and the size of the Gaussian filter (parameterized by σ, the number of pixels per standard deviation.) Assuming a step function of height s, the maximum gradient $\Delta_{max}$ of the blurred step function may be represented as:

$$\Delta_{\max} \approx \frac{s}{n} \quad (19)$$

where $n = \max(1, \sigma\sqrt{2\pi})$

The implication of equation (19) is that if it is desired that a certain level of strong occlusion boundary stops the effective blurring of the ARF (by setting α=0), then the parameters $\Delta_0$ and σ should be considered to be inversely proportional. Next, the A, B, and C terms must be determined. In order to satisfy relationship (18) above, the ratio of A:C is chosen to be equal to the ratio of $\Delta_v$: $\Delta_h$ (again, index terms (i,j) are omitted for convenience.) That is, the ratio of the horizontal and vertical filter weights is inversely proportional to the ratio of the horizontal and vertical gradients. This rule is followed with one exception: if both the horizontal and vertical gradient are smaller than a threshold T (in the default, T=10), then the ratio of A:C is forced to be 1.0, and consequently A=C. The reason for this rule is to avoid rapidly switching the kernel weights in regions of noise (i.e. small gradients.) The ratio r computed by the ratio calculator 138 used to determine the relative weights A, B, and C, is equal to $\Delta_h/\Delta_v$ except in the case when $\Delta_v<T$ and $\Delta_h<T$, when γ=1. In order to select the term B, a final condition is that B must be less than both A and C.

Thus, there are three equations and three unknowns:

$$A+B+C=1 \quad (20)$$

$$B<A \& B<C \quad (21)$$

$$\frac{A}{C} = \frac{\Delta v}{\Delta h} \quad (22)$$

The value of α output from the alpha determiner 134 and the output γ from the ratio calculator 138 are input to the coefficients calculator 136 in order to determine the values of $a_1$, $a_2$, $a_3$, and $b_0$. The coefficients calculator 136 satisfies the equations (20), (21), and (22) by first computing:

$$A = \frac{f}{r+f^2} \quad (23)$$

-continued $$B = \frac{r}{r+f^2} \quad (24)$$

$$C = \frac{rf}{r+f^2} \quad (25)$$

where $r=\Delta_h/\Delta_v$ (unless $\Delta_v<T$ and $\Delta_h<T$, in which case, $\gamma=1.0$) (26)

$f=r+1$ (27)

Finally, the output of the coefficients calculator 136 are the four ARF coefficients for the present filter position, calculated from the values A, B, C, and α as shown below:

$a_1 = \alpha A$ (28)

$a_2 = \alpha B$ (29)

$a_3 = \alpha C$ (30)

$b_0 = (1-\alpha)$ (31)

The output value calculator 140 receives as inputs the coefficients output from the coefficients calculator 136, the input image signal, and any previously computed values of the output image signal necessary to compute the next output image signal value. The output value calculator 140 computes and outputs the value of the output signal, according to Equation 8, 9, 10 or 11 (corresponding with the single-pass ARF applicators 115₁, 115₂, 115₃, and 115₄.) For example, in the case of the first single-pass ARF applicator 115₁, the image input signal, the coefficients output from the coefficients calculator 136, and all previous outputs of the output value calculator 140 are input to the output value calculator 140. When the determination of the output value by output value calculator 140 requires a value of the output image signal that does not yet exist, the value of the image input signal at the same location is substituted, as previously mentioned.

In review, at each pixel in the image (and for each of the four stages of the four-pass ARF), the filter weights A, B, and C, are derived by first calculating the horizontal gradient $\Delta_h$ and vertical gradient $\Delta_v$ (with the gradients calculator 130) of the control signal z(i,j) (e.g., blurred image signal) at same location as the filter is positioned in the image. The ratio r is determined by the ratio calculator 138 using equation (26). The minimum of $\Delta_v$ and $\Delta_h$ (found with the minimum finder 132) is passed through a LUT similar to FIG. 12 to determine a value for α. Finally, since r and α are known, $a_1$, $a_2$, $a_3$, and $b_0$ are calculated by the coefficients calculator 136, which uses equations (23) to (31). These filter weights are then applied to samples of the input image signal (in the case of $b_0$), and the output image signal (in the case of $a_1$, $a_2$, and $a_3$) to generate an output signal value at the current pixel location.

The previous description discussed an ARF in which the number of coefficients is four. However, it will be appreciated that variations and modifications can be affected by a person of ordinary skill in the art without departing from the scope of the invention. For example, the number of coefficients in the filter could easily be increased as long as rules are generated to determine values of each coefficients of the ARF. It remains desirable that despite the number of coefficients, the sum of the coefficients be 1.0 ($\Sigma a_k + \Sigma b_k = 1.0$). Also it is desirable that all of the coefficients be non-negative, although that is not a requirement.

As an example of an alternative embodiment of the four-pass ARF, the invention may include a version of the ARF that is separable in the vertical and horizontal directions of the digital image channel. The advantage of this embodiment is that the calculation of the values of the ARF coefficients is greatly simplified, and processing time is reduced dramatically. In this case, the first single-pass ARF applicator (e.g., FIG. 13A) may be expressed by the equation:

$$y_1(i,j) = a_1 y_1(i-1,j) + b_0 x(i,j) \quad (32)$$

where $y_1(i,j)$ represents the value of the output signal at the $(i, j)^{th}$ pixel location, and x(i,j) represents the value of the digital image channel neu at the $(i, j)^{th}$ pixel location. The selection of the weighting coefficients $a_1$ and $b_0$ will be described later (although similar to the previous description). At each location in the image, the values of these weights are again recalculated.

Referring to FIGS. 13A–D, there is illustrated the arrangement of the filter coefficients in a 5 row by 5 column illustrative image with the image origin in the upper left corner. More specifically, FIGS. 13A–D show the arrangements of the ARF coefficients for the four separable single-pass ARFs. The arrows indicate the path by which the filter proceeds over the image.

Figure 13A:
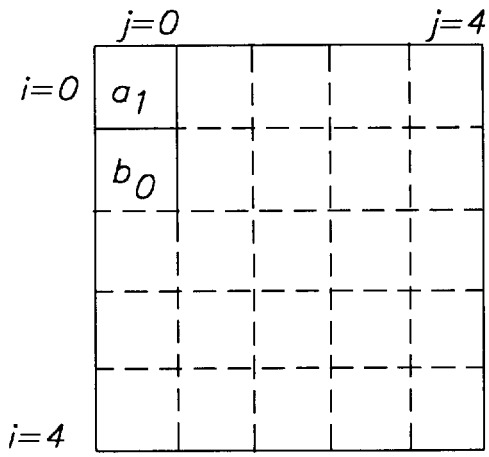
FIGS. 13A–D are arrangements of the ARF coefficients for the four separable single-pass ARFs.

In FIG. 13A, for the first single-pass ARF, the filtering process begins at the top left corner and proceeds down each column until every column has been processed. Note the order of filtering the columns does not affect the result. The filter may move to the right across each column before proceeding to the next row, or the filter may move down the first column before moving on to the second. In either case, the result is equivalent.

Thus, throughout the filtering process, the filter position changes, but the ARF requires only two values (one from the input image signal and one from the output image signal) in order to calculate the next output image signal value. This single stage of filtering induces a phase distortion that can approximately be compensated by applying the ARF in the reverse direction. The second single-pass ARF applicator does just that, and can be represented with the equation:

$$y_2(i,j) = a_1 y_2(i+1,j) + b_0 y_1(i,j) \quad (33)$$

Figure 13B:
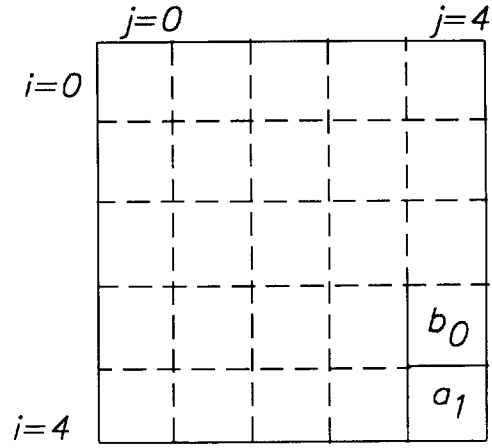

This second single-pass ARF is represented in FIG. 13B. The filtering process begins at the bottom of a column and proceeds up each column until every column has been processed. The third and fourth single-pass ARF applicators apply the ARF to each row in the image, from each direction. The third and fourth single-pass ARF applicators evaluate the equations:

$$y_3(i,j) = a_1 y_3(i,j+1) + b_0 y_2(i,j) \quad (34)$$

$$y_4(i,j) = a_1 y_4(i,j-1) + b_0 y_3(i,j) \quad (35)$$

Figure 13C:
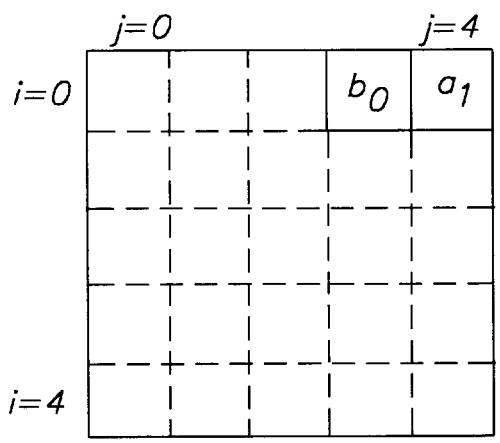
Figure 13D:
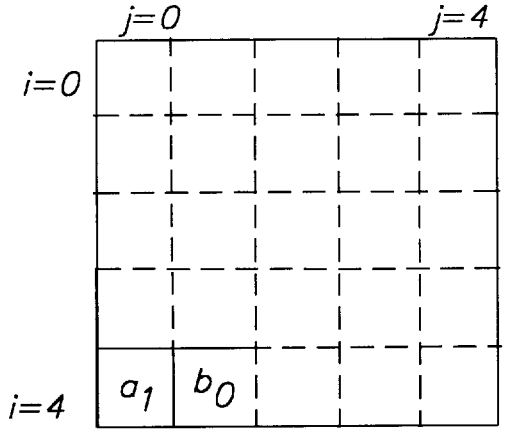

Each of these single-pass ARFs is represented in FIGS. 13C–D. In the third single-pass ARF (FIG. 13C), the filtering process begins at the right of a row of pixels and proceeds across to the left of each row until every row has been processed. In the fourth single-pass ARF (FIG. 13D), the filtering process begins at the left of a row of pixels and proceeds across to the right of each row until every row has been processed.

Figure 14:
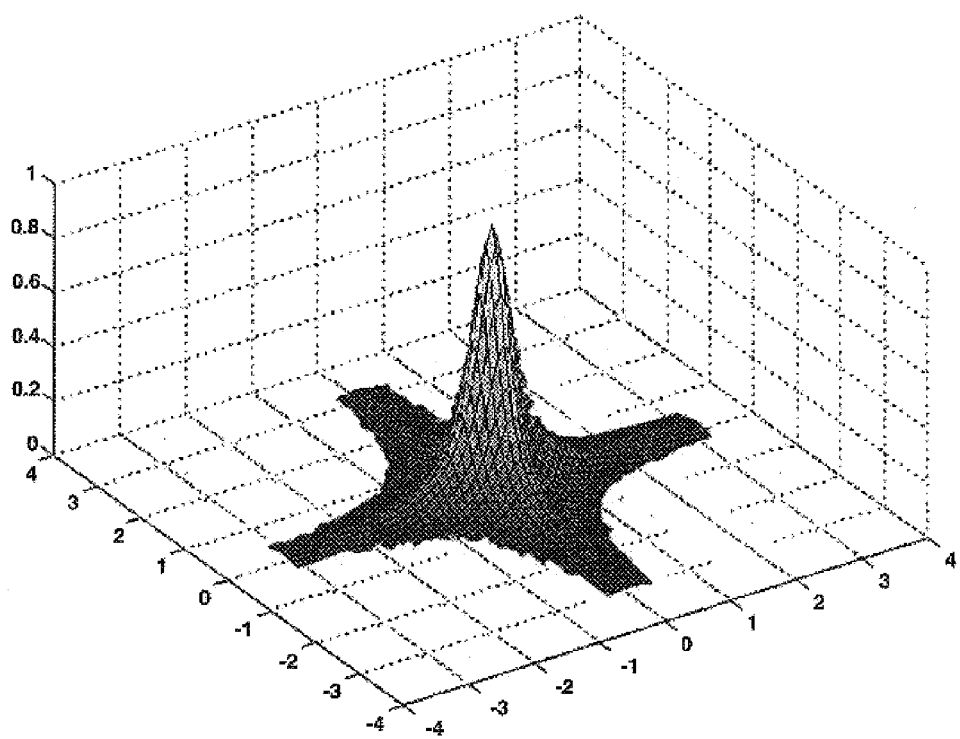
FIG. 14 is a graph illustrating the magnitude of the frequency response of the separable four-pass ARF, assuming that the filter coefficients remain constant.

This separable ARF is again a nonlinear filter because the coefficients $a_1$ and $b_0$ vary throughout the image. However, it is important for this illustration to determine the ARF frequency response, assuming that the filter coefficients remain constant. Assuming $b_0=0.3$, $a_1=0.7$, the magnitude of the frequency response of the four-pass ARF filter is given in FIG. 14. More specifically, FIG. 14 shows the magnitude of the frequency response of the separable four-pass ARF, assuming that the filter coefficients remain constant. Notice that the response is not nearly as radially symmetric as that of the non-separable four-pass ARF shown in FIG. 14.

However, this radial non-symmetry is relatively small, and has not been linked to any artifacts in prints. The maximum difference is directional response for the same frequency is about 0.05 compared with 0, a difference that has not been attributed to any artifacts in processed images.

In this alternative embodiment, the ARF weights are selected individually at each (i,j) location in the image, as before. In this case, the requirement that the sum of the filter coefficients must equal one provides that $a_1+b_0=1$.

The two coefficient single-pass ARF greatly simplifies the process of determining the coefficients, as shown in FIG. 15. More specifically, FIG. 15 shows an exploded view of a single-pass ARF applicator 115 with a two-coefficient filter. The local gradient $\Delta$ (note that in the case of this 2 pixel neighborhood filter, there is only one local gradient) of the signal applied to the control input of single-pass ARF applicator is calculated. First, the signal applied to the control input of single-pass ARF applicator 115 is applied to the gradient calculator 160. The gradient calculator 160 determines and outputs the local gradient $\Delta$ in the neighborhood of the filter position from an analysis of the blurred image signal. In the case of the first single-pass ARF applicator:

$$\Delta(i,j)=|z(i,j)-z(i-1,j)| \quad (36)$$

where $\Delta$ (i,j) is the local measure of the gradient of the control signal (e.g. blurred image signal) applied to the control input of the single-pass ARF applicator at the $(i,j)^{th}$ pixel position and z(i,j) is the value of the control signal applied to the control input of the single-pass ARF applicator at the $(i,j)^{th}$ pixel position.

Since, in this embodiment, there is only one measure of local Gradient, and the minimum finder 132 of FIG. 11 is not required. The a term is generated in a similar manner as in the previous case, by applying the alpha determiner 134 to the value $\Delta$. (The difference is that this time, the LUT is applied to the value $\Delta$ (i,j), rather than $\Delta_{min}$ (i,j).) The ARF coefficients are determined by the coefficients calculator 136 with equations (37) and (38). Finally, these coefficients are used by the output value calculator 140, which multiplies the local pixel values of the signal input x(i,j) and the signal output $y_1$ (i,j). The value $\alpha$ may then be used directly to determine the single-pass ARF coefficients $a_1$ and $b_0$. These coefficients are computed by the following formulas:

$$a_1=\alpha, \quad (37)$$

$$b_0=1-\alpha, \quad (38)$$

The output value is calculated according to equations (32), (33), (34), or (35), as appropriate depending upon the present filtering stage. In the case of the first filtering stage, the value of $y_1$ (i,j) is found.

As another alternative embodiment, the pedestal splitter 50 may contain more than one four-pass ARF applicator, cascaded with the output of one four-pass ARF becoming the control input to the next. This may be arranged by several methods. One method is illustrated in FIG. 16.

Figure 16:
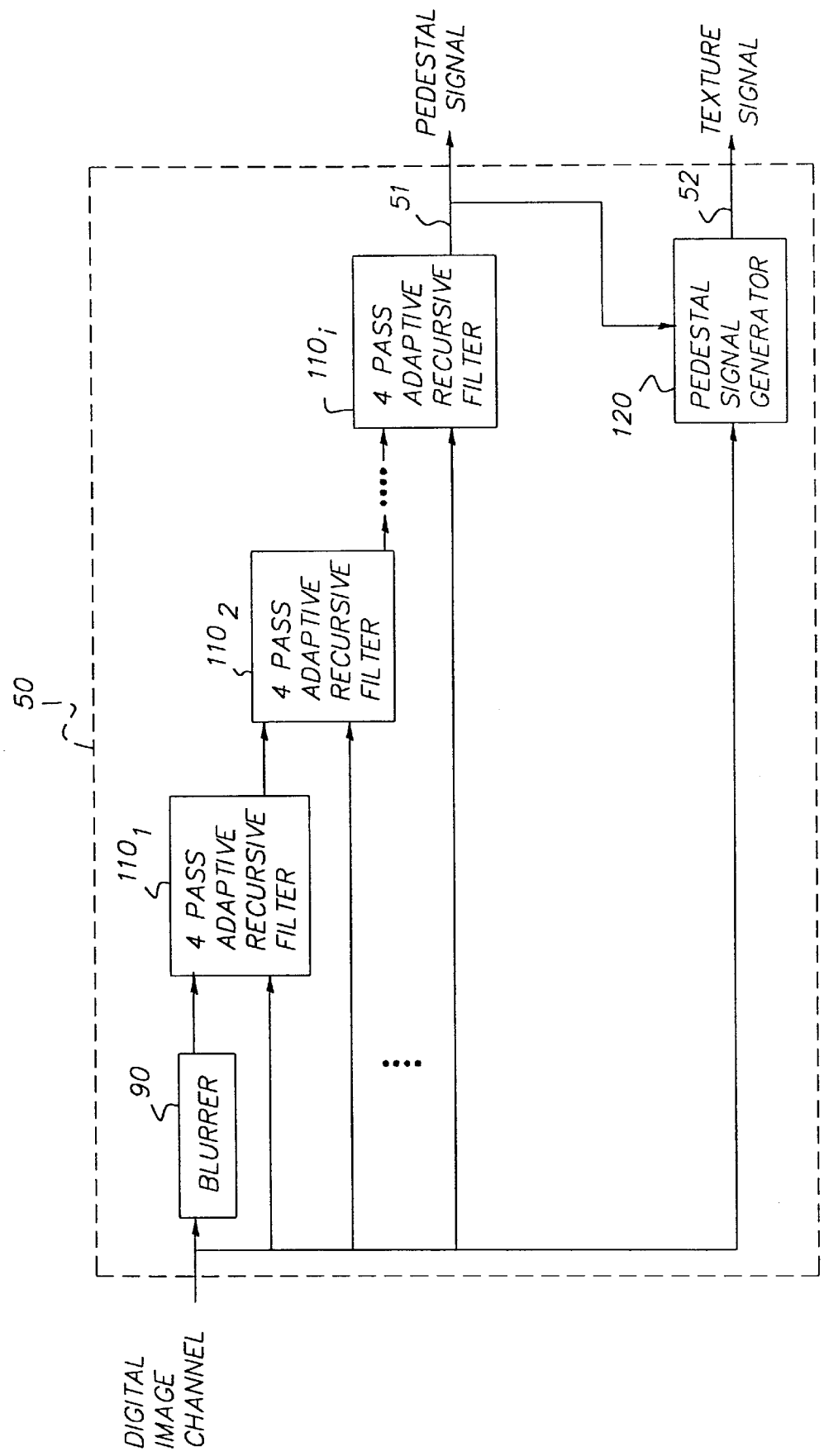
FIG. 16 is a schematic architectural diagram of an alternative pedestal splitter.

More specifically, FIG. 16 shows an exploded view of an alternative pedestal splitter. In this embodiment, the pedestal splitter 50 may contain more than one four-pass ARF applicator, cascaded with the output of one four-pass ARF applicator becoming the control input to the next. This may be arranged by several methods. One such method is illustrated in FIG. 16. The output of a first four-pass ARF applicator $110_1$, is an intermediate pedestal signal that is considered to be the blurred image signal. In essence, the combination of the blurrer 90 and the first four-pass ARF applicator take the place (in an operational sense) of the blurrer 90 shown in FIG. 6.

Again referring to FIG. 16, the output of the first four-pass ARF applicator $110_1$, is applied to the input of the second four-pass ARF applicator $110_2$ that accepts the blurred image signal. Additionally, the digital image channel is applied to the other input of the second four-pass ARF applicator $110_2$. The effect of applying the pedestal signal output from the first four-pass ARF applicator $110_1$, to the blurred image signal input of the second four-pass ARF applicator $110_2$ is that the ARF filter coefficients are derived from an image which already has the properties of a pedestal signal. Thus, the filter coefficients more precisely vary in the neighborhood of large edges. The output of the second four-pass ARF applicator $110_2$ may be considered to be the pedestal signal, or it may be applied to the blurred image input of another four-pass ARF applicator. This process continues until the final filtering stage, the four-pass ARF applicator $110_4$. The pedestal signal output from this four-pass ARF applicator $110_4$ is the pedestal signal 51.

The number of iterations N of the four-pass ARF may be preselected, or N may be the iteration number at which the output of two adjacent applications of the four-pass ARF is equivalent. In addition, the parameters of $\alpha_{max}$ and $\Delta_o$ of each of the iterations of the four-pass ARF applicators may vary or remain constant.

Figure 17:
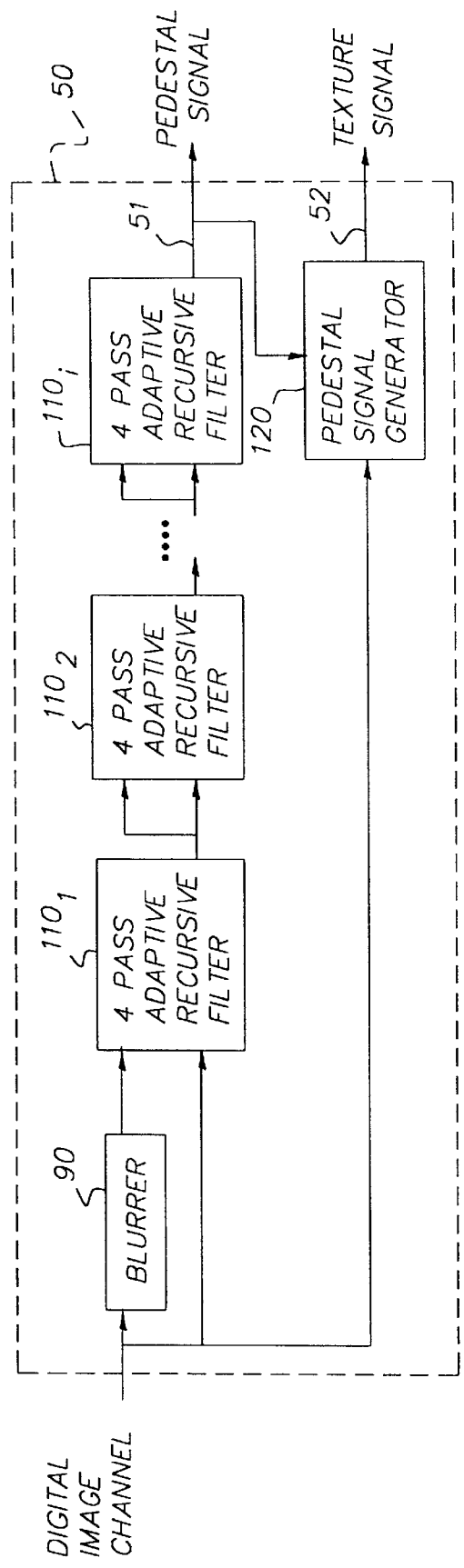
FIG. 17 is a schematic architectural diagram of another alternative pedestal splitter.

In yet another alternative embodiment, the pedestal splitter may contain more than one four-pass ARF applicator, cascaded with the output of one four-pass ARF becoming the signal input to the next. This may be arranged by several methods. One such method is illustrated in FIG. 17. The output of a first four-pass ARF applicator $110_1$ is applied to both the signal input and the control import of the second four-pass ARF applicator $110_2$ that accepts the blurred image signal.

The effect of applying the pedestal signal $y_4$ (i,j), output from the first four-pass ARF $110_1$ to the blurred image signal input of the second four-pass ARF $110_2$ is the compounded effect of several levels of blurring which becomes quite large in relatively smooth areas of the digital image signal neu. The output of the second four-pass $110_2$ $y_4$ $(i,j)_2$ may be considered to be the pedestal signal, or as shown, it may be both the signal input and the control input of another four-pass ARF applicator $110_3$.

This process continues until the final ARF stage $110_i$, the $i^{th}$ four-pass ARF. The pedestal signal output $y_4$ $(i,j)_N$ from the $i^{th}$ four-pass ARF $110_i$ is the pedestal signal $neu_{ped}$ 51 output by the pedestal splitter (FIG. 6) and is used to generate the texture signal $neu_{txt}$ of equation (7). The number of iterations i of the four-pass adaptive recursive filter may be preselected, or N may be the iteration number at which the output of two adjacent applications of the four-pass ARF applicator N−1 and N is equivalent.

In addition, the parameters of $\alpha_{max}$ and $\Delta_o$ of each of the iterations of the four-pass ARF may again vary or remain constant from one iteration to the next. The additional stages of blurring allows lower and lower frequency detail to end up in the texture signal, allowing for the final processed image to have even better texture characteristics.

In one example, the inventive ARF tone scale function application process has been applied to several hundred images, with tone scale functions generated by a variety of manual and automatic tools. The results were excellent. A small optimization has been performed to arrive at suggested operational parameters for application of a compressive tone scale function to an (1024 pixels ×1536 pixel) image. Very few adverse effects have been observed with the invention.

Figure 18:
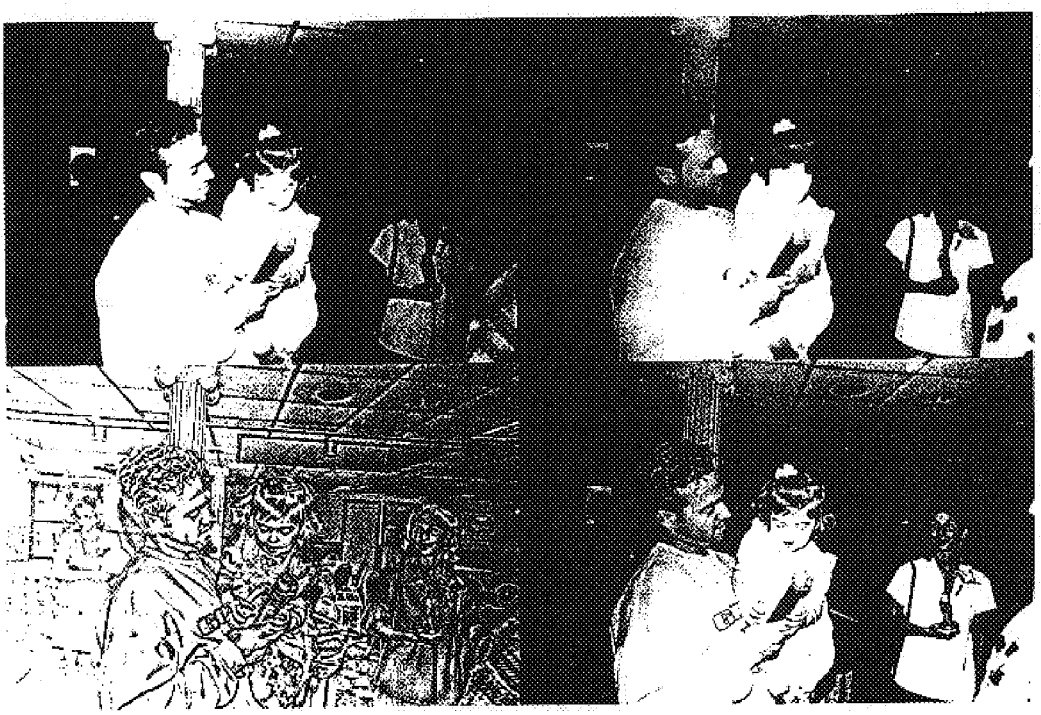
FIG. 18 illustrates an example of a digital image channel at several stages of processing.

The image signals at several stages of the ARF tone scale function application process may be seen in FIG. 18. More specifically, FIG. 18 is an example of a digital image channel at several stages of processing. The top left is the original digital image channel neu. The top right is the pedestal signal $neu_{ped}$ generated by the separable ARF and output by the pedestal splitter (FIG. 6.) Notice that a great deal of smoothing occurs in relatively flat areas, yet the large occlusion edges are not blurred. The bottom left is the texture signal $neu_{txt}$ also output from the pedestal splitter (FIG. 6.) Notice that details of many scales are present. For instance, the texture signal contains fine detail such as the carpet, medium scale detail such as the man's hair, and larger scale details, such as the shadows across the man's sweatshirt and face. Notice also that there is very little content corresponding to regions of large occlusion boundaries in the original digital image channel neu, such as at the transition between the man's light sweatshirt and the dark background. The bottom right is the result of applying a tone scale function to the pedestal signal and adding the texture signal to generate $neu_p$, according to equation (3). Notice that the shadows and highlights are much more visible than in the original image, and the texture still appears natural.

Thus, the original digital image channel neu, the pedestal signal $neu_{ped}$ output from the pedestal splitter (FIG. 6), the texture signal $neu_{txt}$ output from the pedestal splitter (FIG. 6), and the processed digital image channel $neu_p$ (FIG. 2) are all displayed in FIG. 18.

Therefore, the invention includes an adaptive recursive filter in the frame of a tone scale function application. The ARF filter is recursive in nature and adaptive in the sense that the filter coefficients vary according to the local image structure, allowing the filter to blur less in the neighborhood of large occlusion boundaries. This property allows for the creation of a pedestal and texture signal.

The use of the ARF for tone scale function applications allows the preservation of image details with less dependence upon detail size than conventional methods utilizing a single FIR filtering stage, and avoids creating artifacts at occlusion boundaries. In one embodiment, it is still justified to put a constraint on the minimum allowable slope in a tone scale function (at about 0.3.)

The recursive design of the invention allows for fast computation. Both a two dimensional and a separable version of the ARF have been discussed above. However, the faster computation and comparable quality of the separable ARF make it the preferred choice for a given application. A preliminary set of operational parameters has been determined ($\alpha_{max}$=0.955, $\Delta_o$=160, $\sigma$=2.)

It would be understood by one ordinarily skilled in the art given this disclosure that many variations of the tone scale processor 20 shown in FIG. 2 may be derived from permutations of the positions of the tone scale applicator 60 and the pedestal splitter 50 and various combinations of adders 80 and texture modifiers 70. Thus, those skilled in the art will recognize that the inventive pedestal splitter may be used in many situations to achieve a system that provides superior results for application of a tone scale function to a digital image.

While the invention has been described in terms of preferred embodiments, those skilled in the art will recognize that the invention can be practiced with modification within the spirit and scope of the appended claims.

What is claimed is:

1. A method of adjusting the contrast of a digital image comprising:

inputting an image;

dividing said image into a pedestal signal and a texture signal;

applying a tone scale function to said pedestal signal to produce a modified pedestal signal;

adding said texture signal to said modified pedestal signal to produce a processed digital image channel, wherein said dividing comprises recursively filtering a pixel of said image using weighting that is dependent upon coefficients derived from an analysis of neighboring pixels adjacent to said pixel.

2. The method in claim 1, wherein said filtering includes blurring said image such that flat areas of said image are blurred more than edge areas in said image.

3. The method in claim 1, wherein said recursive filtering includes four-pass recursive filtering comprising:

forward filtering said image in a first direction to generate a first intermediate signal;

reverse filtering said first intermediate signal in a direction opposite to said first direction to generate a second intermediate signal;

forward filtering said second intermediate signal in a second direction perpendicular to said first direction to generate a third intermediate signal; and reverse filtering said third intermediate signal in a direction opposite to said second direction.

4. The method in claim 3, wherein said recursive filtering comprises performing a plurality of cascaded four-pass recursive filtering processes wherein an output of a previous four-pass recursive filtering process comprises an input for a next four-pass recursive filtering process.

5. The method in claim 3, wherein said recursive filtering comprises performing a plurality of cascaded four-pass recursive filtering processes wherein an output of a first four-pass recursive filtering process comprises an input for all remaining four-pass recursive filtering processes.

6. The method in claim 1, wherein said filtering includes:

calculating gradients of said neighboring pixels;

finding a minimum gradient of said neighboring pixels;

applying said minimum gradient to a look up table to output a first variable;

determining a ratio of horizontal gradients to vertical gradients; and calculating said coefficients based on said first variable and said ratio.

7. The method in claim 1, wherein said filtering includes:

calculating a gradient of said neighboring pixels;

deriving a first variable from said gradient; and calculating said coefficients based on said first variable.

8. A method of adjusting the contrast of a digital image comprising:

inputting an image;

dividing said image into a pedestal signal and a texture signal;

applying a tone scale function to said pedestal signal to produce a modified pedestal signal;

adding said texture signal to said modified pedestal signal to produce a processed digital image channel, wherein said dividing comprises filtering a pixel of said image using weighting that is dependent upon coefficients derived from an analysis of neighboring pixels adjacent to said pixel, wherein said filtering includes:
calculating gradients of said neighboring pixels;
finding a minimum gradient of said neighboring pixels;
applying said minimum gradient to a look up table to output a first variable;
determining a ratio of horizontal gradients to vertical gradients; and
calculating said coefficients based on said first variable and said ratio.

9. A method of adjusting the contrast of a digital image comprising:
inputting an image;
dividing said image into a pedestal signal and a texture signal;
applying a tone scale function to said pedestal signal to produce a modified pedestal signal;
adding said texture signal to said modified pedestal signal to produce a processed digital image channel,
wherein said dividing comprises filtering a pixel of said image with multiple passes of a recursive filter having weighting coefficients that are dependent upon coefficients derived from an analysis of neighboring pixels.

* * * * *